United States Patent
Jeong et al.

(10) Patent No.: US 10,721,672 B2
(45) Date of Patent: Jul. 21, 2020

(54) METHOD AND DEVICE FOR TRANSMITTING AND RECEIVING DATA IN WIRELESS LAN SYSTEM

(71) Applicant: KT Corporation, Seongnam-si, Gyeonggi-do (KR)

(72) Inventors: Yang Seok Jeong, Seoul (KR); Joo Young Kim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 15/926,241

(22) Filed: Mar. 20, 2018

(65) Prior Publication Data
US 2018/0213464 A1 Jul. 26, 2018

Related U.S. Application Data

(62) Division of application No. 14/909,865, filed as application No. PCT/KR2014/010635 on Nov. 6, 2014, now Pat. No. 10,264,510.

(30) Foreign Application Priority Data

Nov. 6, 2013 (KR) .......................... 10-2013-0133949
Nov. 6, 2013 (KR) .......................... 10-2013-0134142
(Continued)

(51) Int. Cl.
*H04W 40/22* (2009.01)
*H04W 52/02* (2009.01)
(Continued)

(52) U.S. Cl.
CPC ......... *H04W 40/22* (2013.01); *H04W 12/003* (2019.01); *H04W 52/0235* (2013.01);
(Continued)

(58) Field of Classification Search
CPC combination set(s) only.
See application file for complete search history.

(56) References Cited

U.S. PATENT DOCUMENTS 8,908,550 B2   12/2014  Kwon et al.
2002/0188723 A1*  12/2002  Choi ................. H04W 36/06
                                            709/225
(Continued)

FOREIGN PATENT DOCUMENTS

CN       1638309 A       7/2005
KR   10-2011-0119555 A   11/2011
(Continued)

OTHER PUBLICATIONS

IEEE 11-13/0288r0, "TXOP Sharing Operation for Relay" by Wong et. al; Mar. 25, 2013.*
(Continued)

*Primary Examiner* — Andrew C Oh
(74) *Attorney, Agent, or Firm* — Sughrue Mion, PLLC

(57) ABSTRACT

Disclosed are a method and a device for transmitting and receiving data in a wireless LAN system. A connection method performed in a terminal comprises the steps of: transmitting a probe request frame; receiving, from a main-access point, a probe response frame which is a response to the probe request frame; and transmitting, to the main-access point, an ACK frame which is a response to the probe response frame if it is determined that an operation is performed in an uplink relay mode on the basis of information included in the probe response frame. Thus, the wireless transmission efficiency of a wireless LAN system is capable of being improved.

9 Claims, 20 Drawing Sheets

(30) Foreign Application Priority Data

Nov. 6, 2014 (KR) ........................ 10-2014-0153703
Nov. 6, 2014 (KR) ........................ 10-2014-0153718

(51) Int. Cl.

| | | |
|---|---|---|
| H04W 12/00 | (2009.01) | |
| H04W 12/06 | (2009.01) | |
| H04W 84/12 | (2009.01) | |
| H04W 12/04 | (2009.01) | |

(52) U.S. Cl.

CPC ............ H04W 12/04 (2013.01); H04W 12/06 (2013.01); H04W 84/12 (2013.01); Y02D 70/00 (2018.01); Y02D 70/122 (2018.01); Y02D 70/1244 (2018.01); Y02D 70/1246 (2018.01); Y02D 70/1262 (2018.01); Y02D 70/1264 (2018.01); Y02D 70/142 (2018.01); Y02D 70/144 (2018.01); Y02D 70/146 (2018.01); Y02D 70/22 (2018.01); Y02D 70/26 (2018.01); Y02D 70/39 (2018.01)

(56) References Cited

U.S. PATENT DOCUMENTS

| | | | | |
|---|---|---|---|---|
| 2005/0009565 A1* | 1/2005 | Kwak | ................... | H04W 24/08 455/561 |
| 2005/0141543 A1* | 6/2005 | Nishimura | ............ | H04W 74/06 370/443 |
| 2005/0207400 A1* | 9/2005 | Shinohara | ............ | H04W 74/02 370/352 |
| 2006/0165078 A1* | 7/2006 | Gopinath | .............. | H04W 48/04 370/389 |
| 2008/0117855 A1 | 5/2008 | Choi et al. | | |
| 2008/0212508 A1 | 9/2008 | Morimoto et al. | | |
| 2009/0010191 A1* | 1/2009 | Wentink | ............ | H04W 52/0216 370/311 |
| 2010/0002656 A1* | 1/2010 | Ji | ........................ | H04W 72/082 370/336 |
| 2010/0091669 A1* | 4/2010 | Liu | .......................... | H04L 45/20 370/252 |
| 2010/0331037 A1* | 12/2010 | Jen | ..................... | H04W 52/146 455/522 |
| 2011/0019555 A1* | 1/2011 | Gotoh | .............. | H04W 52/0241 370/252 |
| 2012/0038475 A1* | 2/2012 | Lee | ...................... | G08B 25/009 340/502 |
| 2012/0230247 A1 | 9/2012 | Kwon et al. | | |
| 2012/0307685 A1 | 12/2012 | Kim et al. | | |
| 2013/0039262 A1 | 2/2013 | Lim et al. | | |
| 2013/0235720 A1* | 9/2013 | Wang | ................ | H04W 28/0278 370/229 |
| 2013/0235773 A1* | 9/2013 | Wang | ................ | H04W 52/0206 370/311 |
| 2013/0301569 A1* | 11/2013 | Wang | ................... | H04L 5/0055 370/329 |
| 2014/0086131 A1* | 3/2014 | Seok | ................... | H04B 7/0452 370/311 |
| 2014/0112225 A1* | 4/2014 | Jafarian | ............ | H04W 52/0235 370/311 |
| 2014/0112226 A1* | 4/2014 | Jafarian | ............ | H04W 52/0229 370/311 |
| 2014/0112229 A1* | 4/2014 | Merlin | .............. | H04W 52/0209 370/311 |
| 2014/0140208 A1* | 5/2014 | Cherian | ............ | H04W 28/0289 370/230 |
| 2014/0177501 A1* | 6/2014 | Seok | ................... | H04W 52/0216 370/311 |
| 2014/0177514 A1* | 6/2014 | Azizi | ................. | H04B 7/15528 370/315 |
| 2015/0003367 A1* | 1/2015 | Seok | ................... | H04W 74/002 370/329 |
| 2015/0009879 A1* | 1/2015 | Kim | ...................... | H04W 74/06 370/311 |
| 2015/0036572 A1* | 2/2015 | Seok | ................. | H04W 52/0216 370/311 |
| 2015/0057008 A1* | 2/2015 | Seok | ..................... | H04L 5/0092 455/452.1 |
| 2015/0085780 A1* | 3/2015 | Kim | ................... | H04W 52/0216 370/329 |
| 2015/0208436 A1* | 7/2015 | Seok | ................... | H04W 74/002 370/329 |
| 2015/0237623 A1* | 8/2015 | Choi | ................... | H04W 72/121 370/329 |
| 2015/0244448 A1* | 8/2015 | Seok | ................. | H04W 72/0446 370/315 |
| 2015/0249529 A1* | 9/2015 | Zheng | ................... | H04L 1/1685 370/336 |
| 2015/0381676 A1* | 12/2015 | Seok | ........................ | H04W 4/06 370/315 |

FOREIGN PATENT DOCUMENTS

| | | |
|---|---|---|
| KR | 10-1294504 B1 | 8/2013 |
| WO | 2011/040763 A2 | 4/2011 |
| WO | 2011/096752 A2 | 8/2011 |
| WO | 2013112377 A1 | 8/2013 |

OTHER PUBLICATIONS

IEEE 11-11/1137r13, "IEEE P802.11 Wireless LANs" by Minyoung Park; Jan. 2013.*

IEEE 11-12/1329r0, "PS-POLL for downlink bufferable units," by Wong et al; Nov. 2012.*

IEEE 802.11-12/1234r0 "IEEE P802.11 Wireless LANs" by Yeongho Seok et al; Jul. 2013.*

International Search Report for PCT/KR2014/010635 dated Mar. 6, 2015 [PCT/ISA/210].

Written Opinion for PCT/KR2014/010635 dated Mar. 6, 2015 [PCT/ISA/237].

* cited by examiner

FIG. 6

| ELEMENT ID | LENGTH | DTIM COUNT | DTIM PERIOD | BITMAP CONTROL | PARTIAL VIRTUAL BITMAP |
|---|---|---|---|---|---|
| 1 | 1 | 1 | 1 | 1 | 1-251 |

OCTET:

METHOD AND DEVICE FOR TRANSMITTING AND RECEIVING DATA IN WIRELESS LAN SYSTEM

CROSS-REFERENCE TO RELATED APPLICATIONS

This application is a continuation application of U.S. patent application Ser. No. 14/909,865, filed on Feb. 3, 2016, which claims the benefits of National Stage application under 35 U.S.C. § 371 of PCT/KR2014/010635 filed on Nov. 6, 2014, and Korean Patent Application No. 10-2014-0153703, filed on Nov. 6, 2014, Korean Patent Application No. 10-2014-0153718, filed Nov. 6, 2014, Korean Patent Application No. 10-2013-0134142, filed Nov. 6, 2013, and Korean Patent Application No. 10-2013-0133949, filed Nov. 6, 2013, in the Korean Intellectual Property Office, the disclosures of which are incorporated herein in their entirety by reference.

TECHNICAL FIELD

The present invention generally relates to data transmission/reception technology in a wireless local area network (WLAN) system and, more particularly, to a method and device for transmitting and receiving data to and from an end terminal in a WLAN system including a relay device.

BACKGROUND ART

With the development of information and communication technology, various wireless communication technologies have been developed. Among these technologies, a wireless local area network (WLAN) denotes technology for allowing wireless access to the Internet in homes, businesses or specific service areas using a mobile terminal such as a personal digital assistant (PDA), a laptop computer, a portable multimedia player (PMP), a smart phone, or a tablet PC, based on radio frequency (RF) technology.

Standards for WLAN technology have been developed as Institute of Electrical and Electronics Engineers (IEEE) 802.11 standards. WLAN technology conforming to the IEEE 802.11a standard is operated based on an orthogonal frequency division multiplexing (OFDM) scheme, and is capable of providing a maximum data rate of 54 Mbps in a 5 GHz band. WLAN technology conforming to the IEEE 802.11b standard is operated based on a direct sequence spread spectrum (DSSS) scheme, and is capable of providing a maximum data rate of 11 Mbps in a 2.4 GHz band. WLAN technology conforming to the IEEE 802.11g standard is operated based on the OFDM or DSSS scheme, and is capable of providing a maximum data rate of 54 Mbps in a 2.4 GHz band.

WLAN technology conforming to the IEEE 802.11n standard is operated based on the OFDM scheme in a 2.4 GHz band and a 5 GHz band, and is capable of providing a maximum data rate of 300 Mbps for four spatial streams when a Multiple-Input Multiple-Output OFDM (MIMO-OFDM) scheme is used. WLAN technology conforming to the IEEE 802.11n standard may support a channel bandwidth of up to 40 MHz and is capable of providing a maximum data rate of 600 Mbps in that case.

As the popularization of such WLAN technology has been activated and applications using WLANs have been diversified, the requirement for new WLAN technology that supports throughput higher than that of existing WLAN technology is increasing. Very high throughput (VHT) WLAN technology is proposed technology that supports a data rate of 1 Gbps or more. Meanwhile, in a system based on such WLAN technology, a problem arises in that, as the distance between WLAN devices increases, communication efficiency is deteriorated.

DISCLOSURE

Technical Problem

An object of the present invention to solve the above problems is to provide a data transmission/reception method for improving the efficiency of a WLAN system.

Another object of the present invention to solve the above problems is to provide a data transmission/reception device for improving the efficiency of a WLAN system.

Technical Solution

In accordance with an embodiment of the present invention to accomplish the above objects, an association method that is performed by a terminal includes transmitting a probe request frame, receiving a probe response frame that is a response to the probe request frame from a master access point, and transmitting an acknowledgement (ACK) frame that is a response to the probe response frame to a relay device associated with the master access point when it is determined that an operation is performed in an uplink relay mode, based on information included in the probe response frame.

Here, the association method may further include transmitting an authentication request frame to the relay device, and receiving an authentication response frame that is a response to the authentication request frame from the master access point.

Here, the association method may further include transmitting an association request frame to the relay device, and receiving an association response frame that is a response to the association request frame from the master access point.

Here, the probe request frame may include a field indicating whether a relevant frame is a frame transmitted in a relay manner.

Here, the probe request frame may be transmitted to the master access point through the relay device.

Here, the probe response frame may include at least one of a field indicating whether an operation is performed in an uplink relay mode, and an identifier of the relay device.

Here, the authentication request frame may be transmitted to the master access point through the relay device.

Here, the association request frame may be transmitted to the master access point through the relay device.

Here, the association response frame may include a field indicating whether the terminal has been associated with the master access point in an uplink relay mode.

In accordance with another embodiment of the present invention to accomplish the above objects, an association method that is performed by a master access point includes receiving a probe request frame from a relay device associated with the master access point, transmitting a probe response frame, as a response to the probe request frame, to a terminal, the probe response frame including information indicating whether an operation is performed in an uplink relay mode, and receiving an ACK frame that is a response to the probe response frame from the relay device.

Here, the association method may further include receiving an authentication request frame from the relay device, and transmitting an authentication response frame that is a response to the authentication request frame to the terminal.

Here, the association method may further include receiving an association request frame from the relay device, and transmitting an association response frame that is a response to the association request frame to the terminal.

Here, the probe request frame may include a field indicating whether a relevant frame is a frame transmitted in a relay manner.

Here, the probe response frame may include at least one of a field indicating whether an operation is performed in an uplink relay mode, and an identifier of the relay device.

Here, the association response frame may include a field indicating whether the terminal has been associated with the master access point in an uplink relay mode.

In accordance with a further embodiment of the present invention to accomplish the above objects, an association method that is performed by a relay device includes receiving a probe request frame from a terminal, and transmitting the probe request frame to the master access point when the probe request frame is a frame transmitted in a relay manner.

Here, the probe request frame may include a field indicating whether a relevant frame is a frame transmitted in a relay manner.

Here, the probe request frame may include an SSID filed that may be set to an SSID of the master access point or any value.

In accordance with yet another embodiment of the present invention to accomplish the above objects, a data reception method that is performed by a terminal associated with a relay device, including receiving a beacon frame from a master access point associated with the relay device, transmitting a power save (PS)-Poll frame to the relay device when it is determined, based on the beacon frame, that data to be transmitted to the terminal is present in the master access point, receiving a data frame that is a response to the PS-Poll frame from the master access point, and transmitting an ACK frame that is a response to the data frame to the relay device.

Here, the terminal may belong to a master-basic service set formed by the master access point and a relay-basic service set formed by the relay device.

Here, a certain frame transmitted from the terminal may include information indicating a type of a frame transmitted from a communication entity that has received the certain frame.

Here, the PS-Poll frame may be transmitted to the master access point through the relay device.

Here, the PS-Poll may include an SIG field that includes information indicating that, after the PS-Poll frame, a null data packet (NDP) response is to be transmitted.

Here, the data frame may include a SIG field that includes information indicating that, after the data frame, a normal response is to be transmitted.

Here, the data frame may include a duration field in which a period required to protect transmission of at least two ACK frames is set.

Here, the ACK frame may be transmitted to the master access point through the relay device.

Here, the ACK frame may include a SIG field that includes information indicating that, after the ACK frame, a normal response is to be transmitted.

In accordance with still another embodiment of the present invention to accomplish the above objects, a data transmission method that is performed by a master access point associated with a relay device includes transmitting a beacon frame indicating that data to be transmitted to a terminal associated with the relay device is present, receiving a PS-Poll frame from the relay device, and transmitting a data frame to the terminal when it is determined, based on the PS-Poll frame, that the terminal is in a state in which data can be received.

Here, the data transmission method may further include receiving an ACK frame that is a response to the data frame from the relay device.

Here, the data transmission method may further include retransmitting the data frame to the terminal when an ACK frame that is a response to the data frame is not received from the relay device within a preset relay ACK timeout.

Here, the relay ACK timeout may be designated to be longer than 'SIFS+RX_start_delay+slot time'.

Here, the terminal may belong to a master-basic service set formed by the master access point and a relay-basic service set formed by the relay device.

Here, the data frame may include a duration field in which a period required to protect transmission of at least two ACK frames is set.

Advantageous Effects

In accordance with the present invention, the wireless transmission efficiency of a WLAN system can be improved.

DESCRIPTION OF DRAWINGS

FIG. 6 is a block diagram showing an embodiment of the structure of a TIM information element (IE);

BEST MODE

Figure 1:
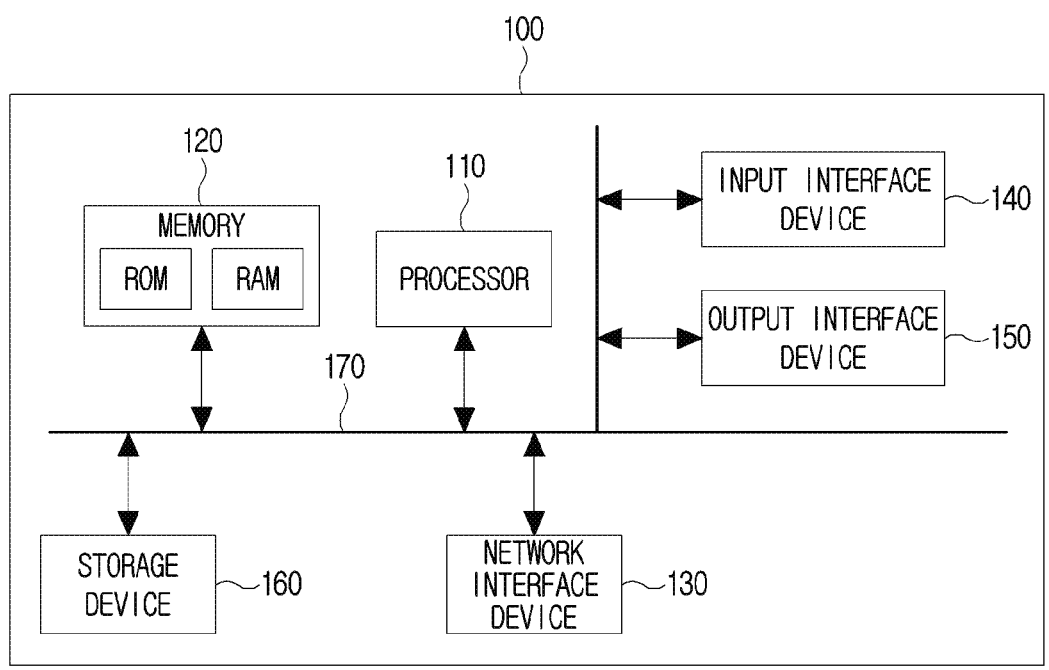
FIG. 1 is a block diagram showing an embodiment of a station for performing methods according to the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms such as "first" and "second" may be used to describe various components, but those components should not be limited by the terms. The terms are merely used to distinguish one component from other components. A first component may be designated as a second component and a second component may be designated as a first component in the similar manner, without departing from the scope based on the concept of the present invention. The term "and/or" includes a combination of a plurality of related items or any of the plurality of related items.

It should be understood that a representation indicating that a first component is "connected" or "coupled" to a second component may include the case where the first component is connected or coupled to the second component with some other component interposed therebetween, as well as the case where the first component is "directly connected" or "directly coupled" to the second component. In contrast, it should be understood that a representation indicating that a first component is "directly connected" or "directly coupled" to a second component means that no component is interposed between the first and second components.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Hereinafter, preferred embodiments of the present invention will be described in detail with reference to the attached drawings. For easy understanding of the entire part of the invention in the following description of the present invention, the same reference numerals are used to designate the same or similar elements throughout the drawings, and repeated descriptions of the same components will be omitted.

Throughout the present specification, a station (STA) denotes any functional medium that includes medium access control (MAC) conforming to the IEEE 802.11 standards and a physical layer interface for a wireless medium. Stations may be classified into a station (STA) that is an access point (AP) and a station (STA) that is a non-AP. The station that is an AP may be simply called an access point (AP), and the station that is a non-AP may be simply called a terminal.

A 'station (STA)' may include a processor and a transceiver, and may further include a user interface, a display device, etc. The processor denotes a unit devised to generate a frame to be transmitted over a wireless network or process a frame received over the wireless network, and may perform various functions to control the station (STA). The transceiver denotes a unit that is functionally connected to the processor and is devised to transmit and receive a frame over the wireless network for the station (STA).

An 'access Point (AP)' may denote a centralized controller, a base station (BS), a radio access station, a Node B, an evolved Node B, a relay, a Mobile Multihop Relay (MMR)-BS, a Base Transceiver System (BTS), a site controller, etc., and may include some or all of the functions thereof.

A 'terminal (i.e. non-AP)' may denote a Wireless Transmit/Receive Unit (WTRU), User Equipment (UE), a User Terminal (UT), an Access Terminal (AT), a Mobile Station (MS), a mobile terminal, a subscriber unit, a Subscriber Station (SS), a wireless device, a mobile subscriber unit, etc., and may include some or all of the functions thereof.

Here, the terminal may denote a desktop computer capable of communication, a laptop computer, a tablet PC, a wireless phone, a mobile phone, a smart phone, a smart watch, smart glasses, an e-book reader, a Portable Multimedia Player (PMP), a portable game console, a navigation device, a digital camera, a Digital Multimedia Broadcasting (DMB) player, a digital audio recorder, a digital audio player, a digital picture recorder, a digital picture player, a digital video recorder, a digital video player, etc.

FIG. 1 is a block diagram showing an embodiment of a station for performing methods according to the present invention.

Referring to FIG. 1, a station 100 may include at least one processor 110, memory 120, and a network interface device 130 connected to a network and configured to perform communication. The station 100 may further include an input interface device 140, an output interface device 150, and a storage device 160. The components included in the station 100 may be connected to each other through a bus 170, and may then perform communication with each other.

The processor 110 may execute program commands stored in the memory 120 and/or the storage device 160. The processor 110 may denote a central processing unit (CPU), a graphics processing unit (GPU), or an exclusive processor for performing the methods according to the present invention. Each of the memory 120 and the storage device 160 may be implemented as a volatile storage medium and/or a nonvolatile storage medium. For example, the memory 120 may be implemented as read only memory (ROM) and/or random access memory (RAM).

The embodiments of the present invention are applied to a WLAN system conforming to the IEEE 802.11 standards, and may also be applied to other communication systems as well as the WLAN system conforming to the IEEE 802.11 standards.

For example, the embodiments of the present invention may be applied to the mobile Internet such as a Wireless Personal Area Network (WPAN), a Wireless Body Area Network (WBAN), Wireless Broadband Internet (WiBro), or Worldwide Interoperability for Microwave Access (Wimax), a second generation (2G) mobile communication network such as a Global System for Mobile communication (GSM) or Code Division Multiple Access (CDMA), a 3G mobile communication network such as Wideband Code Division Multiple Access (WCDMA) or CDMA2000, a 3.5G mobile communication network such as High-Speed Downlink Packet Access (HSDPA) or High-Speed Uplink Packet Access (HSUPA), a 4G mobile communication network such as Long-Term Evolution (LTE) or LTE-Advanced, or a 5G mobile communication network.

Figure 2:
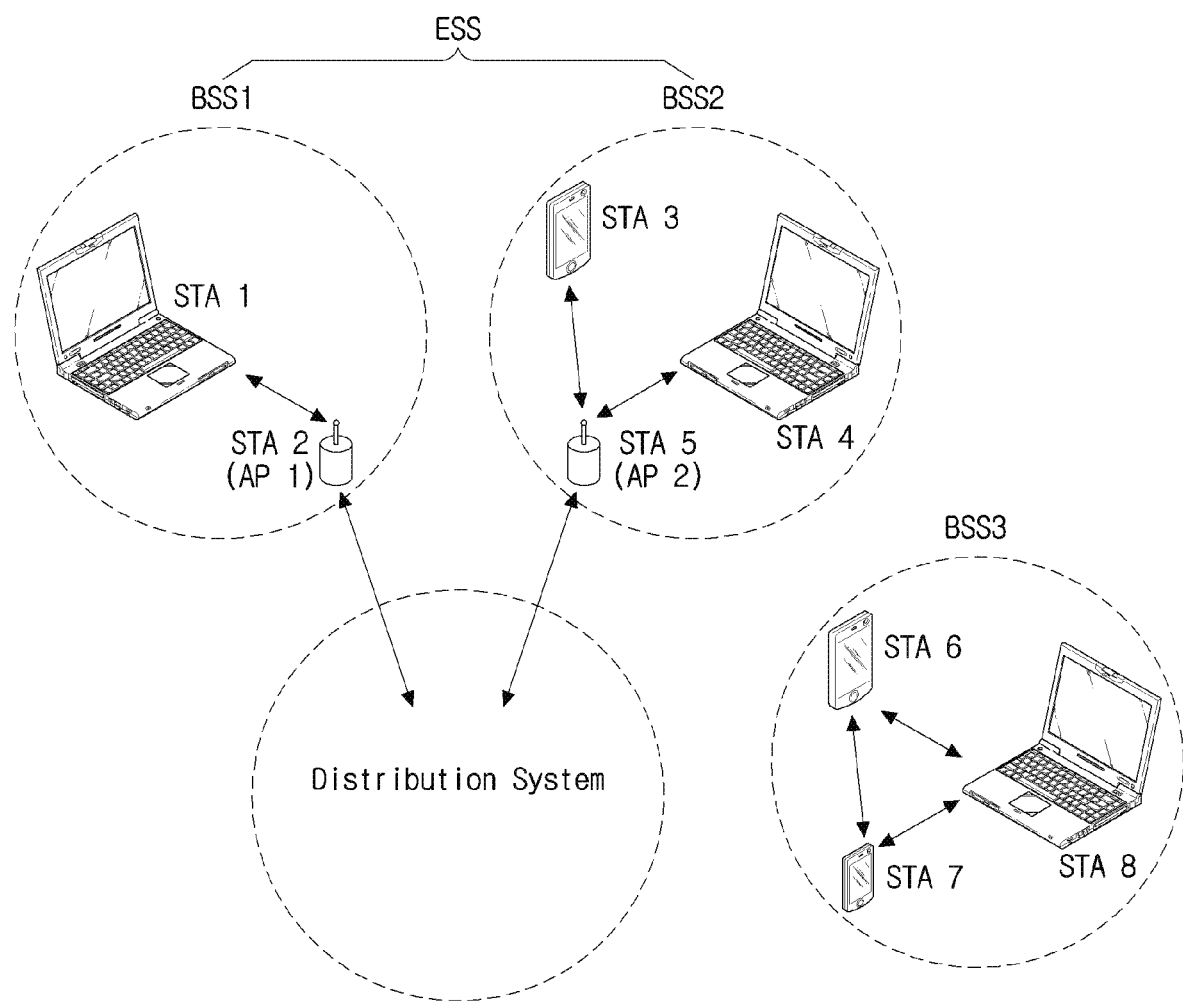
FIG. 2 is a conceptual diagram showing an embodiment of the configuration of a WLAN system conforming to IEEE 802.11.

FIG. 2 is a conceptual diagram showing an embodiment of the configuration of a WLAN system conforming to IEEE 802.11.

Referring to FIG. 2, the WLAN system conforming to IEEE 802.11 may include at least one basic service set (BSS). The BSS denotes a set of stations (STA1, STA2 (AP1), STA3, STA4, STA5 (AP2), STA6, STA1, STA8) which are successfully synchronized with each other and are capable of communicating with each other, and is not a concept meaning a specific area.

BSSs may be classified into an infrastructure BSS and an independent BSS (IBSS). Here, BSS1 and BSS2 denote infrastructure BSSs and BSS 3 denotes an IBSS.

BSS1 may include a first terminal STA1, a first access point STA2 (AP1) for providing a distribution service, and a distribution system (DS) for connecting multiple access points STA2 (AP1) and STA5 (AP2) to each other. In BSS1, the first access point STA2 (AP1) may manage the first terminal STA1.

BSS2 may include a third terminal STA3, a fourth terminal STA4, a second access point STA5 (AP2)) for providing a distribution service, and a distribution system (DS) for connecting the multiple access points STA2 (AP1) and STA5 (AP2) to each other. In the BSS2, the second access point STA5 (AP2) may manage the third terminal STA3 and the fourth terminal STA4.

BSS3 denotes an IBSS operating in an ad-hoc mode. In the BSS3, there is no access point that functions as a centralized management entity. That is, in the BSS3, terminals STA6, STA7, and STA8 are managed in a distributed manner. In the BSS3, all of the terminals STA6, STA7, and STA8 may denote mobile terminals, and access to the distribution system (DS) is not permitted, thus constituting a self-contained network.

The access points STA2 (AP1) and STA5 (AP2) may provide access to the distribution system (DS) via a wireless medium for the terminals STA1, STA3, and STA4 connected thereto. Communication between the terminals STA1, STA3, and STA4 in the BSS1 or BSS2 is generally performed via the access point STA2 (AP1) or STA5 (AP2), but direct communication may be performed between the terminals STA1, STA3, and STA4 when a direct link is set up therebetween.

Multiple infrastructure BSSs may be connected to each other through the distribution system (DS). The multiple BSSs connected through the distribution system (DS) are called an extended service set (ESS). The entities included in the ESS, that is, STA1, STA2 (AP1), STA3, STA4, and STA5 (AP2), are capable of communicating with each other, and any terminal STA1, STA3, or STA4 may move from a single BSS to another BSS while performing seamless communication in the same ESS.

The distribution system (DS) is a mechanism for allowing one access point to communicate with another access point. In accordance with the DS, the access point may transmit frames for terminals coupled to a BSS managed thereby, or may transmit frames for any terminal that has moved to another BSS. Further, the access point may transmit and receive frames to and from an external network, such as a wired network. Such a DS is not necessarily a network and is not limited in its form as long as it is capable of providing a predetermined distribution service defined in the IEEE 802.11 standards. For example, the distribution system may be a wireless network such as a mesh network, or a physical structure for connecting the access points to each other.

Each terminal (STA) in the infrastructure BSS may be associated with an access point (AP). When associated with the access point (AP), the terminal (STA) may transmit and receive data.

Figure 3:
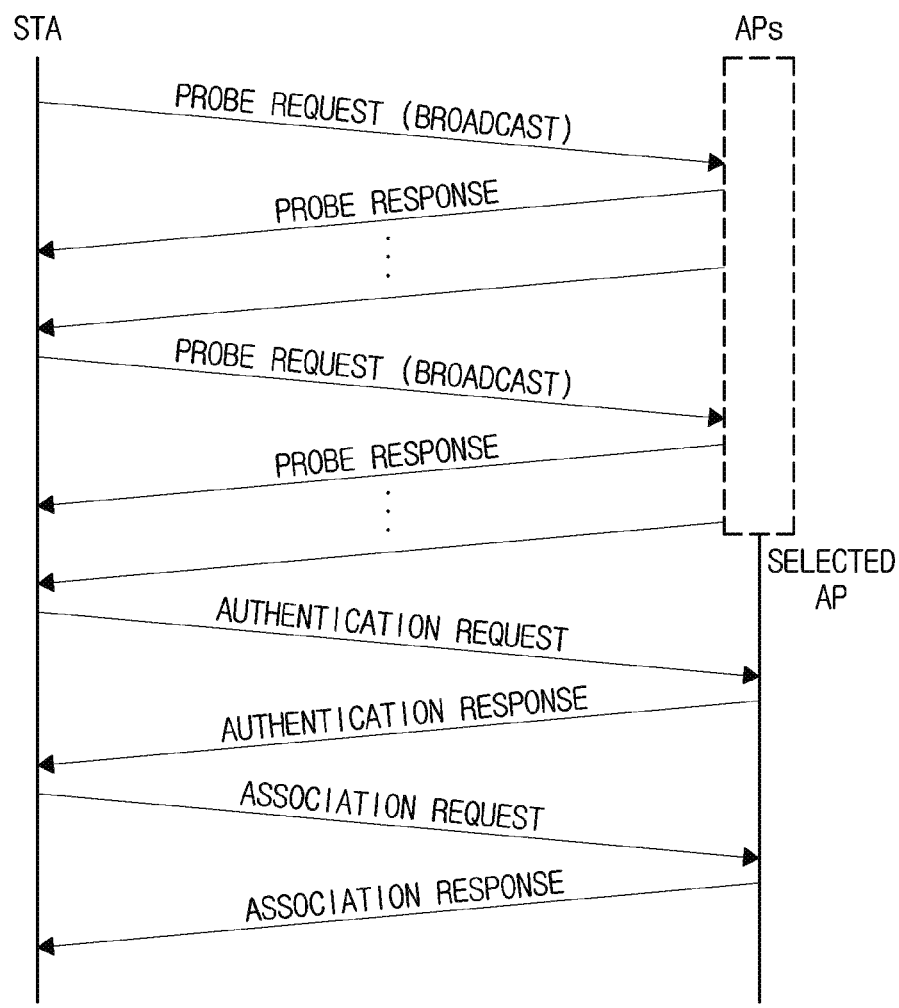
FIG. 3 is a flowchart showing a terminal association procedure in an infrastructure BSS.

FIG. 3 is a flowchart showing a terminal association procedure performed in an infrastructure BSS.

Referring to FIG. 3, the STA association procedure performed in the infrastructure IBSS may be chiefly divided into the step of probing an AP (probe step), the step of performing authentication with the probed AP (authentication step), and the step of associating with the AP with which authentication has been performed (association step).

The terminal (STA) may first probe neighboring APs using a passive scanning method or an active scanning method. When the passive scanning method is used, the terminal (STA) may probe neighboring APs by overhearing the beacons transmitted from the APs. When the active scanning method is used, the STA may probe neighboring APs by transmitting a probe request frame and receiving a probe response frame which is a response to the probe request frame from the APs.

When neighboring APs are probed, the STA may perform the step of performing authentication with each probed AP. In this case, the STA may perform the step of performing authentication with multiple APs. Authentication algorithms conforming to the IEEE 802.11 standards may be classified into an open system algorithm for exchanging two authentication frames with each other and a shared key algorithm for exchanging four authentication frames with each other.

Based on the authentication algorithms conforming to the IEEE 802.11 standards, the STA may transmit an authentication request frame and receive an authentication response frame, which is a response to the authentication request frame, from each AP, thus completing authentication with each AP.

When authentication has been completed, the STA may perform the step of associating with the AP. In this case, the STA may select a single AP from among the APs with which authentication has been performed, and may perform the step of associating with the selected AP. That is, the STA may transmit an association request frame to the selected AP and receive an association response frame, which is a response to the association request frame, from the selected AP, thus completing association with the selected AP.

The WLAN system denotes a local area network in which multiple communication entities conforming to the IEEE 802.11 standards may exchange data with each other in a wirelessly connected state.

Figure 4:
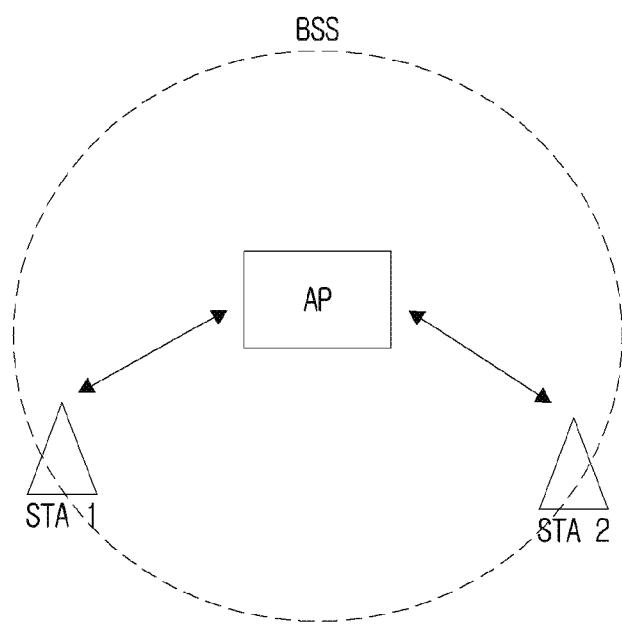
FIG. 4 is a conceptual diagram showing the infrastructure BSS of a WLAN system.

FIG. 4 is a conceptual diagram showing the infrastructure BSS of a WLAN system.

Referring to FIG. 4, the infrastructure BSS may include a single access point (AP) and multiple terminals STA1 and STA2. The AP may transmit a beacon frame including a service set ID (SSID), which is a unique identifier, in a broadcast manner. The beacon frame may provide information about the presence and association of the AP to terminals that are not associated with the AP, and may notify the terminals associated with the AP of the presence of data that is transmitted to a specific terminal.

Each terminal that is not associated with the AP may probe the AP using a passive scanning method or an active scanning method, and may acquire association information from the probed AP. In the case of the passive scanning method, the terminal may probe the AP by receiving a beacon frame from the AP. In the case of the active scanning method, the terminal may probe the AP by transmitting a probe request frame and receiving a probe response frame, which is a response thereto, from the AP.

Each terminal that is not associated with the AP may attempt to perform authentication with a specific AP based on association information acquired from the beacon frame or the probe response frame. A terminal that has succeeded in authentication may transmit an association request frame to the corresponding AP, and the AP, having received the association request frame, may transmit an association response frame including the AID of the terminal to the terminal. Via the above procedure, the terminal may be associated with the AP.

Figure 5:
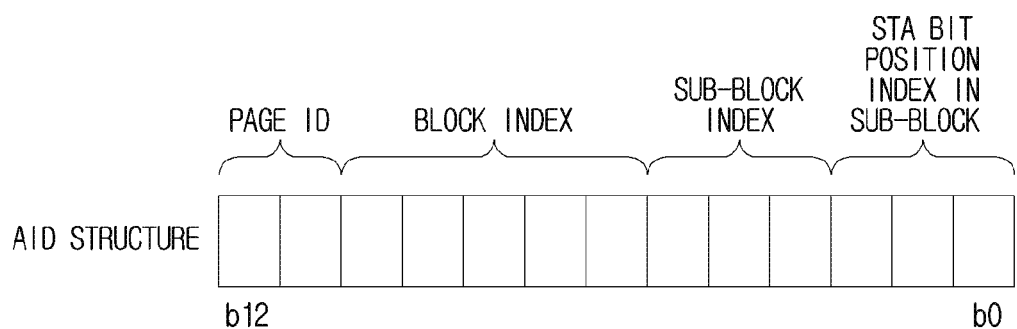
FIG. 5 is a block diagram showing an embodiment of a hierarchical AID structure.

FIG. 5 is a block diagram showing an embodiment of a hierarchical AID structure.

Referring to FIG. 5, in the IEEE 802.11 standards, an AID having a hierarchical structure may be used to efficiently manage multiple terminals. An AID assigned to a single terminal may be composed of a page ID, a block index, a sub-block index, and a terminal bit index (STA bit index). The group to which the terminal belongs (i.e. a page group, a block group, or a sub-block group) may be identified using information about individual fields.

FIG. 6 is a block diagram showing an embodiment of the structure of a traffic indication map (TIM) information element (IE).

Referring to FIG. 6, the TIM IE may include an element ID field, a length field, a delivery traffic indication message (DTIM) count field, a DTIM period field, a bitmap control field, and a partial virtual bitmap field. That is, the TIM IE includes information required to indicate a bit corresponding to the AID of a terminal when data to be transmitted to the terminal is buffered in the AP, and this information may be encoded into the bitmap control field and the partial virtual bitmap field.

Figure 7:
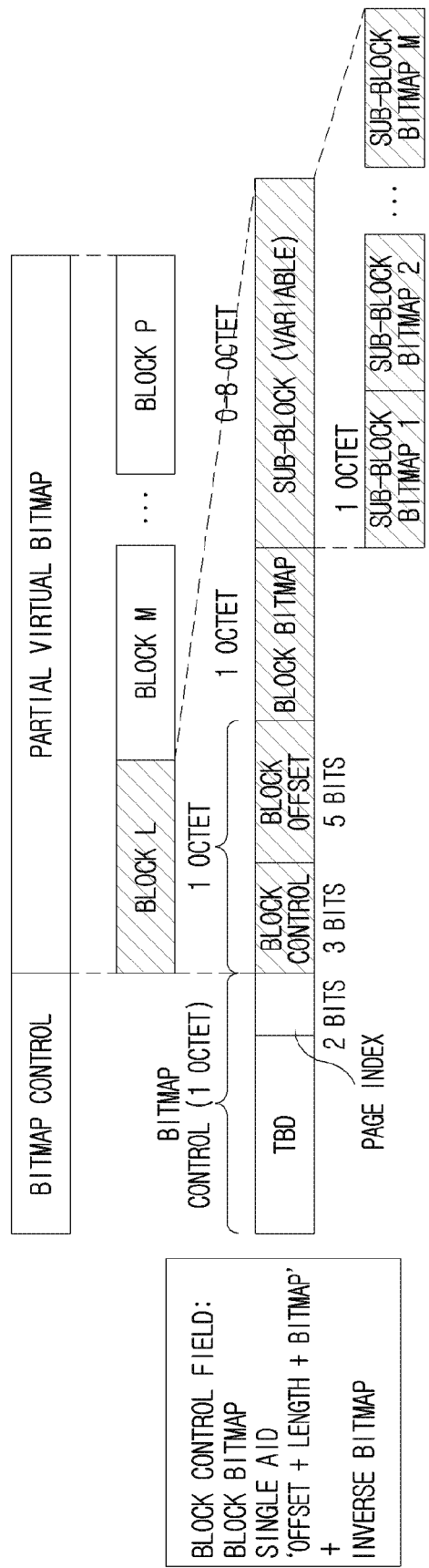
FIG. 7 is a block diagram showing an embodiment of the structure of a TIM encoded on a block basis.

FIG. 7 is a block diagram showing an embodiment of the structure of a TIM encoded on a block basis.

Referring to FIG. 7, in the IEEE 802.11 standards, the TIM may be encoded on a block basis. A single encoding block may include a block control field, a block offset field, a block bitmap field, and at least one sub-block field.

The block control field may denote the encoding mode of the TIM. That is, the block control field may represent a block bitmap mode, a single AID mode, an offset+length+ bitmap (OLB) mode, or an inverse bitmap mode. The block offset field may represent the offset of an encoded block. The block bitmap field may represent a bitmap indicating the location of the sub-block in which an AID bit is set. The sub-block bitmap field may represent a bitmap indicating the location of an AID in the sub-block.

Figure 8:
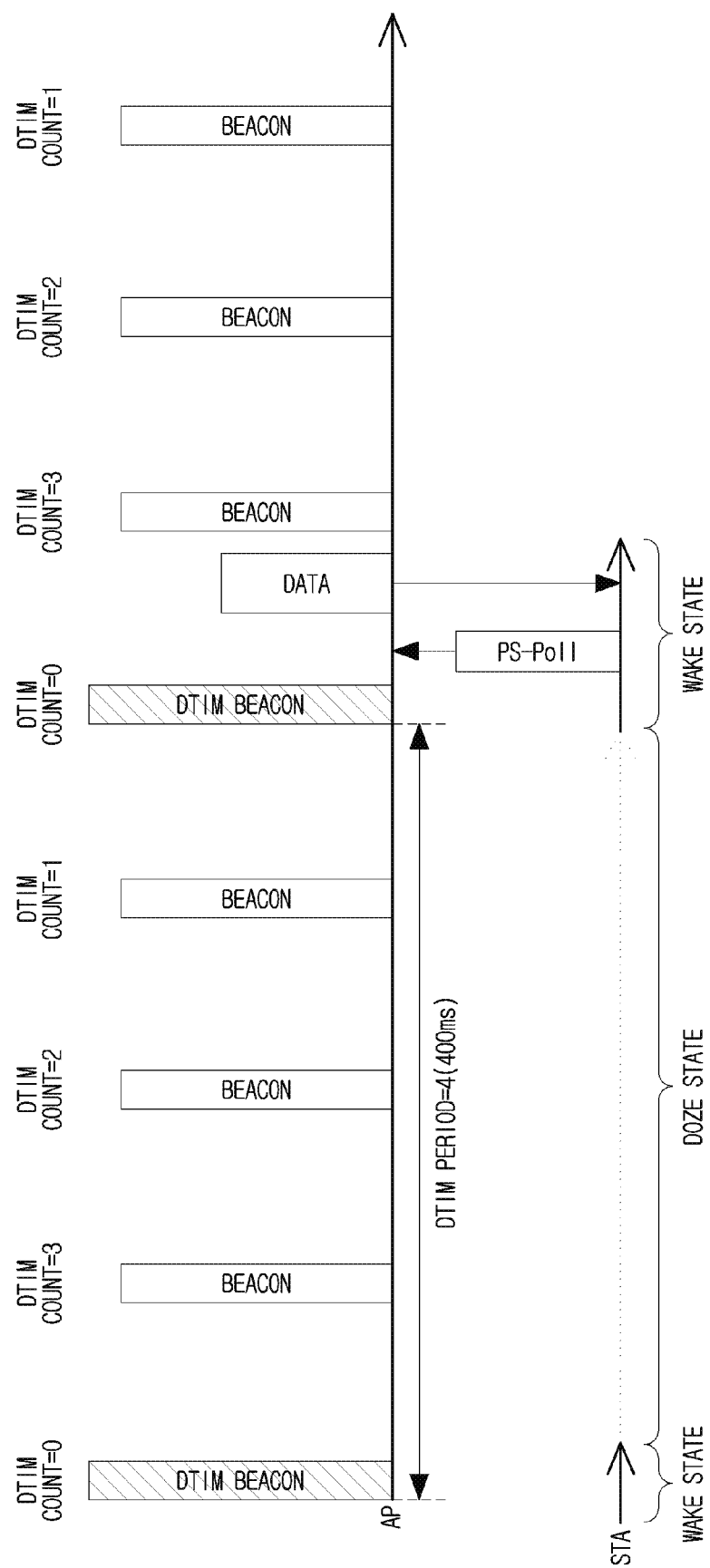
FIG. 8 is a flowchart showing an embodiment of a data transmission/reception method.

FIG. 8 is a flow diagram showing an embodiment of a data transmission/reception method.

Referring to FIG. 8, an access point (AP) may transmit a beacon frame including a TIM IE in a broadcast manner. A terminal (STA) operating in a power saving mode (PSM) may be awakened at intervals of a beacon period, in which a DTIM count becomes 0, and may receive a beacon frame. The terminal (STA) is configured to, when a bit corresponding to its AID is set to '1' in the TIM included in the received beacon frame, transmit a power save (PS)-Poll frame to the AP, thus notifying the AP that the STA is ready to receive data. Upon receiving the PS-Poll frame, the AP may transmit a data frame to the corresponding STA.

In the WLAN system, communication entities (i.e. access points, terminals, etc.) share a wireless channel and contend with other entities to access the wireless channel based on a carrier sense multiple access (CSMA)/collision avoidance (CA) scheme. First, each communication entity may check the occupied state of the wireless channel using a physical channel sensing scheme and a virtual channel sensing scheme before accessing the wireless channel.

The physical channel sensing scheme may be implemented via channel sensing, which detects whether energy of a predetermined level or more is present in the wireless channel. When energy of a predetermined level or more is detected using the physical channel sensing scheme, the terminal may determine that the wireless channel is occupied by another terminal, and thus may perform again channel sensing after waiting for a random backoff time. Meanwhile, when energy of less than a predetermined level is detected using the physical channel sensing scheme, the terminal may determine that the wireless channel is in an idle state, and may then access the corresponding wireless channel and transmit a signal through the wireless channel.

The virtual channel sensing scheme may be implemented by setting a predicted channel occupation time using a network allocation vector (NAV) timer. In the WLAN system, upon transmitting a frame, a communication entity may write the time required to complete the transmission of the corresponding frame in the duration field of the header of the frame. When normally receiving a certain frame through the wireless channel, the communication entity may set its own NAV timer based on a value in the duration field of the header of the received frame. When receiving a new frame before the NAV timer has expired, the communication entity may update the NAV timer based on the value in the duration field of the header of the newly received frame. When the NAV timer has expired, the communication entity may determine that the occupation of the wireless channel has been released, and may then contend for access to a wireless channel.

The communication entity may support multiple data rates of a physical layer depending on various modulation schemes and various channel coding rates. Generally, a high data rate for the physical layer enables a large amount of data to be transmitted during a short wireless channel occupation time, but requires high signal quality. In contrast, a low data rate for the physical layer enables data to be transmitted even at low signal quality, but requires a relatively long wireless channel occupation time.

Since wireless channel resources are shared among communication entities, the overall capacity of the WLAN system may be increased only when a specific communication entity transmits the largest amount of data during a time period during which the communication entity occupies a wireless channel. That is, the overall capacity of the WLAN system may be increased when the terminal transmits and receives data to and from the AP at the highest possible data rate for the physical layer. The highest data rate for the physical layer may be realized when signal quality is sufficiently secured owing to a short distance between the AP and the terminal. Alternatively, the highest data rate for the physical layer may be realized when signal quality is sufficiently secured in such a way that a communication entity transmits a signal at sufficiently high transmission power. If terminals are located far away from the AP, or if a communication entity uses limited transmission power, the data rate for the physical layer is decreased, thus consequently reducing the overall capacity of the WLAN system.

In particular, when the WLAN system is applied to a sensor network, the number of sensor terminals located a long distance from the AP may increase due to the characteristics of the sensor network that supports a wide area. In this case, there is no problem in the downlink quality of the AP for which power may be easily secured, but a problem may arise in the uplink quality of sensor terminals designed at low power. Therefore, a sensor terminal located a long distance from the AP uses a low data rate for an uplink physical layer so as to secure reliable uplink quality, and thus the overall capacity of the WLAN system may be seriously decreased. Further, a low-power terminal consumes more power because it must be awakened for a longer period of time upon transmitting the same data when a low data rate for the physical layer is used.

Figure 9:
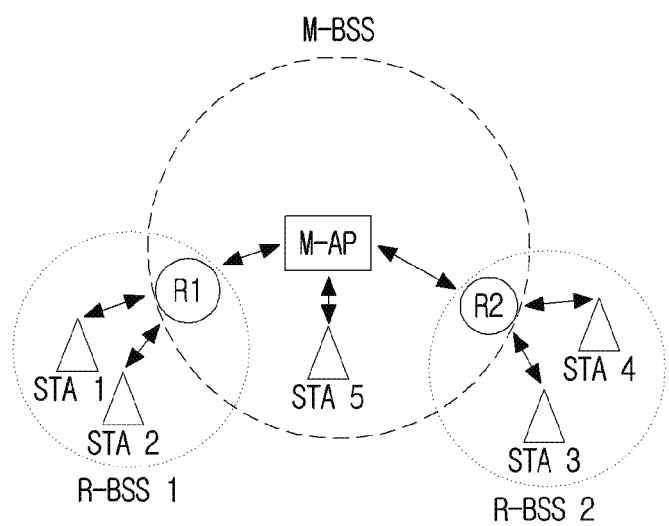
FIG. 9 is a conceptual diagram showing an embodiment of a WLAN system including relay devices.

FIG. 9 is a conceptual diagram showing an embodiment of a WLAN system including relay devices.

Referring to FIG. 9, a master access point (master-AP: M-AP), a first relay device R1, a second relay device R2, and a fifth terminal STA5 may constitute a master-basic service set (M-BSS). The first relay device R1, a first terminal STA1, and a second terminal STA2 may constitute a first relay BSS (R1-BSS). The second relay device R2, a third terminal STA3, and a fourth terminal STA4 may constitute a second relay BSS (R2-BSS). The relay devices R1 and R2 may be located at the place where signal quality between the master access point (M-AP) and the terminals STA1, STA2, STA3, and STA4 is deteriorated. The first relay device R1 may relay data transmitted between the master access point (M-AP) and the first and second terminals STA1 and STA2. The second relay device R2 may relay data transmitted between the master access point (M-AP) and the third and fourth terminals STA3 and STA4. That is, the physical area of the master access point (M-AP) may be extended via the relay devices R1 and R2.

Figure 10:
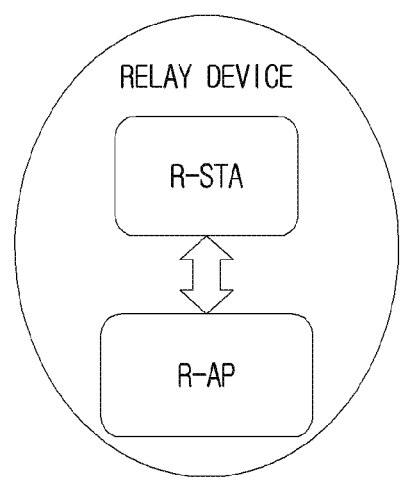
FIG. 10 is a block diagram showing the logical configuration of a relay device.

FIG. 10 is a block diagram showing the logical configuration of a relay device.

Referring to FIG. 10, the relay device may include a relay terminal (R-STA), functioning as a master access point (M-AP), and a relay access point (R-AP), functioning as an access point for terminals belonging to an extended area.

The relay terminal (R-STA) may probe the master access point (M-AP) by receiving a beacon frame or a probe response frame transmitted from the master access point (M-AP) according to the same procedure as a normal terminal. Thereafter, the relay terminal (R-STA) may sequentially perform a procedure for authentication with the probed master access point (M-AP) and a procedure for association with the M-AP.

When the relay terminal (R-STA) is associated with the master access point (M-AP), the relay access point (R-AP) may serve a relay BSS. That is, the relay access point (R-AP) may transmit its own beacon frame, or alternatively, transmit a probe response frame that is a response to a probe request frame to an end terminal belonging to the relay BSS.

If it is determined that association with the relay access point (R-AP) is more beneficial than association with the master access point (M-AP), the end terminal belonging to the relay BSS may perform procedures for authentication and association with the relay access point (R-AP). In contrast, if it is determined that association with the master access point (M-AP) is more beneficial than association with the relay access point (R-AP), the end terminal belonging to the relay BSS may perform procedures for authentication and association with the master access point (M-AP).

The relay terminal (R-STA) may relay data transmitted between the master access point (M-AP) and an end terminal. In this case, the relay terminal (R-STA) may relay data that is transmitted using a 4-address field. The 4-address field includes a destination address (DA) field indicating the address of the final destination of data, a source address (SA) field indicating the address of the place where the data was generated, a transmitter address (TA) field indicating the address of the communication entity that physically transmits a frame containing the data, and a receiver address (RA) field indicating the address of the communication entity that is to physically receive the frame containing the data.

For example, when desiring to transmit data to an end terminal through a relay device, the master access point (M-AP) may configure and transmit the header address field of a data frame as follows.

TA field: address of master access point (M-AP)(i.e. MAC address)
RA field: address of relay device (i.e. MAC address)
DA field: address of end terminal (i.e. MAC address)
SA field: address of master access point (M-AP)(i.e. MAC address)

The relay terminal (R-STA) may forward a data frame received from the relay access point (R-AP) to the master access point (M-AP), and may forward a data frame received from the master access point (M-AP) to the relay access point (R-AP).

When the relay terminal (R-STA) and the master access point (M-AP) are associated with each other and a transfer path is acquired, the relay access point (R-AP) may periodically transmit a beacon frame including an identifier (SSID) identical to that of the master access point (M-AP). Also, the relay access point (R-AP) may transmit a probe response frame in response to a probe request frame from the end terminal, transmit an authentication response frame in response to an authentication request frame from the end terminal, and transmit an association response frame in response to an association request frame from the end terminal. That is, the relay access point (R-AP) may perform the same function as the master access point (M-AP).

An end terminal located near the relay device may be associated with a relay-AP (R-AP) located closer to the end terminal than the master access point (M-AP) and may secure high signal quality, thus enabling data to be transmitted at a high data rate of the physical layer.

The relay access point (R-AP) may generate a beacon frame including an indicator indicating that the R-AP itself is a communication entity for relaying data transmitted between the master access point (M-AP) and the end terminal, and may transmit the generated beacon frame. Such an indicator may be defined either using one bit in the beacon frame or using the address field of the master access point (M-AP).

The relay access point (R-AP) may transmit a data frame to the end terminal using a 4-address field in the same way as the relay terminal (R-STA). Alternatively, the relay access point (R-AP) may transmit a data frame to the end terminal using a 3-address field (SA=TA, RA, and DA) when the SA field is identical to the TA field. Alternatively, the relay access point (R-AP) may transmit a data frame to the end terminal using a 2-address field (RA, TA). When a data frame is received from the end terminal via a 3-address field (SA=TA, RA, DA) or a 2-address field (RA, TA), the relay access point (R-AP) may transmit the corresponding data frame to the relay terminal (R-STA).

Figure 11:
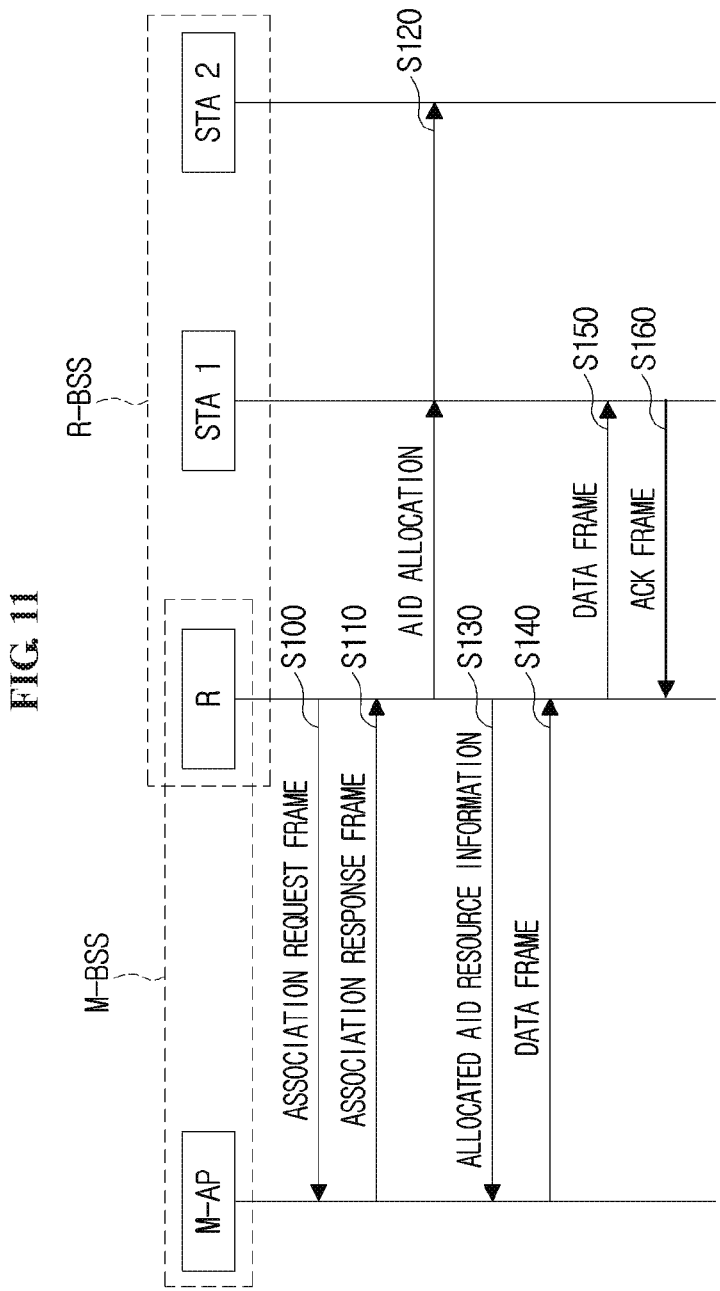
FIG. 11 is a flowchart showing another embodiment of a data transmission/reception method.

FIG. 11 is a flowchart showing another embodiment of a data transmission/reception method.

Referring to FIG. 11, a master access point (M-AP) may serve a M-BSS, and a relay device R may belong to the M-BSS. The relay device R may serve an R-BSS and a first terminal STA1 and a second terminal STA2 may belong to the R-BSS.

When a procedure for authentication with the master access point (M-AP) is completed, the relay device R may perform an association procedure. That is, the relay device R may transmit an association request frame to the master access point (M-AP) (S1100). Here, the association request frame may include an indicator that requests the allocation of AID resources for terminals belonging to the R-BSS.

When the association request frame is received from the relay device R, the master access point (M-AP) may acquire the indicator included in the association request frame, and may then determine an AID resource allocation request for terminals belonging to the R-BSS based on the indicator. Therefore, the master access point (M-AP) may transmit an association response frame, including a reference AID to be used to allocate AIDs of the terminals belonging to the R-BSS, to the relay device R (S1110). Here, the reference AID may denote the AID of the relay device R. Meanwhile, when an AID is hierarchically configured, as described above with reference to FIG. 5, the reference AID may be set on a page ID basis, a block index basis, or a sub-block index basis.

When the association response frame is received from the master access point (M-AP), the relay device R may allocate AIDs to the first terminal STA1 and the second terminal STA2 belonging to the R-BSS, based on the reference AID included in the association response frame (S1120). For example, when the reference AID is set on a page ID basis, the relay device R may allocate different AIDs to the first terminal STA1 and the second terminal STA2 belonging to the R-BSS, within a page ID range indicated by the reference AID. When the reference AID is set on a block index basis, the relay device R may allocate different AIDs to the first terminal STA1 and the second terminal STA2 belonging to the R-BSS, within a block index range indicated by the reference AID. When the reference AID is set on a sub-block index basis, the relay device R may allocate different AIDs to the first terminal STA1 and the second terminal STA2 belonging to the R-BSS, within a sub-block index range indicated by the reference AID.

Figure 12:
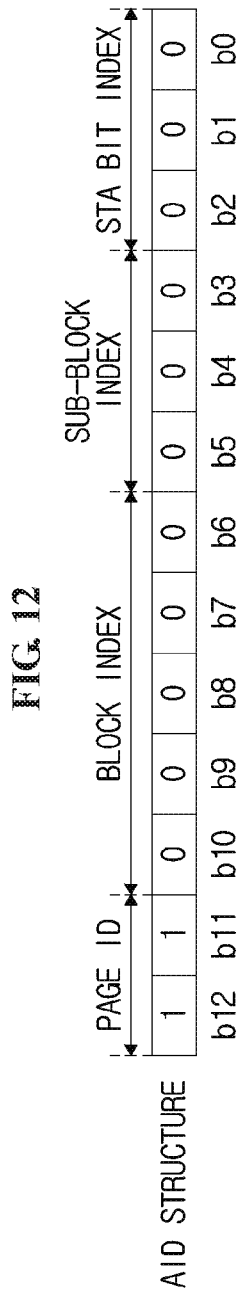
FIG. 12 is a block diagram showing an embodiment of an AID designated on a page ID basis.

FIG. 12 is a block diagram showing an embodiment of an AID designated on a page ID basis.

Referring to FIG. 12, a master access point (M-AP) may designate the range of AIDs for communication entities, belonging to an R-BSS, on a page ID basis. For example, the master access point (M-AP) may allocate '11 00000 000 000b' as the AID of a relay device R. In this case, the relay device R may allocate AIDs to terminals belonging to the R-BSS within the range of a page ID (i.e. page ID group 3(11b)) indicated by its own AID. That is, the relay device R may allocate AIDs to the terminals belonging to the R-BSS within the range of '11 00000 000 001b' to '11 11111 111 111b'. Meanwhile, the master access point (M-AP) may allocate the AIDs of other communication entities (e.g. a relay device, a terminal, and the like) belonging to the M-BSS within the range of page ID groups 0 to 2 (00b, 01b, 10b). According to this configuration, communication entities constituting a WLAN system may be identified using AIDs that are unique identifiers.

Figure 13:
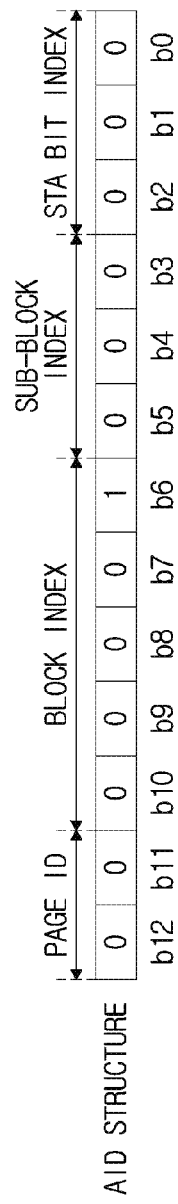
FIG. 13 is a block diagram showing an embodiment of an AID designated on a block index basis.

FIG. 13 is a block diagram showing an embodiment of an AID designated on a block index basis.

Referring to FIG. 13, a master access point (M-AP) may designate the range of AIDs for communication entities belonging to an R-BSS on a block index basis. For example, the master access point (M-AP) may allocate '00 00001 000 000b' as the AID of the relay device R. In this case, the relay device R may allocate AIDs to terminals belonging to the R-BSS within the range of a block index indicated by its own AID. That is, the relay device R may allocate AIDs to terminals belonging to the R-BSS within the range of '00 00001 000 001b' to '00 00001 111 111b'.

Figure 14:
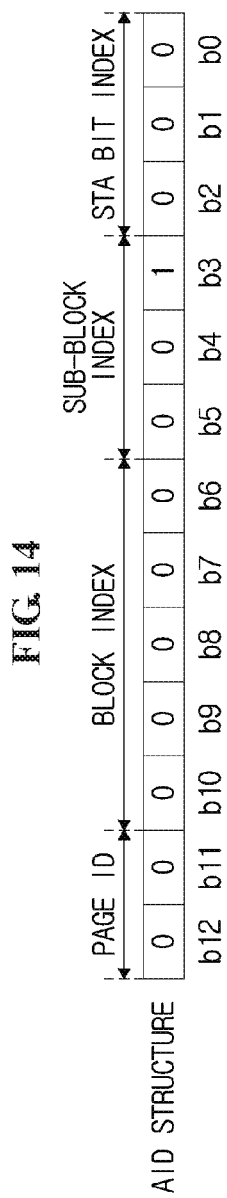
FIG. 14 is a block diagram showing an embodiment of an AID designated on a sub-block index basis.

FIG. 14 is a block diagram showing an embodiment of an AID designated on a sub-block index basis.

Referring to FIG. 14, a master access point (M-AP) may designate the range of AIDs for communication entities belonging to an R-BSS on a sub-block index basis. For example, the master access point (M-AP) may allocate '00 00000 001 000b' as the AID of the relay device R. In this case, the relay device R may allocate AIDs to terminals belonging to the R-BSS within the range of a sub-block index indicated by its own AID. That is, the relay device R may allocate AIDs to terminals belonging to the R-BSS within the range of '00 00000 001 001b' to '00 00000 001 111b'.

Referring back to FIG. 11, the relay device R may transmit information about AID resources allocated to terminals belonging to the R-BSS to the master access point (M-AP) (S1130). At this time, the relay device R may transmit the MAC addresses of terminals belonging to the R-BSS, together with the information about AID resources allocated to the terminals, to the master access point (M-AP). For example, the relay device R may transmit the AID and the MAC address of the first terminal STA1 to the master access point (M-AP), and may transmit the AID and the MAC address of the second terminal STA2 to the master access point (M-AP).

When there is a data frame to be transmitted to the first terminal STA1, the master access point (M-AP) may configure an address field included in the corresponding data frame in the following manner.

First Embodiment of Address Field
RA field: MAC address of relay device R
TA field: MAC address of master access point (M-AP)
DA field: MAC address of first terminal STA1
SA field: MAC address of master access point (M-AP)
Second Embodiment of Address Field
RA field: MAC address of relay device R
TA field: MAC address of master access point (M-AP)
DA field: AID of first terminal STA1
SA field: MAC address of master access point (M-AP)
Third Embodiment of Address Field
RA field: AID of relay device R
TA field: MAC address of master access point (M-AP)
DA field: MAC address of first terminal STA1
SA field: MAC address of master access point (M-AP)
Fourth Embodiment of Address Field
RA field: AID of relay device R
TA field: MAC address of master access point (M-AP)
DA field: AID of first terminal STA1
SA field: MAC address of master access point (M-AP)

The master access point (M-AP) may transmit a data frame including the address field, configured in the above manner, to the relay device R (S1140). When the data frame is received from the master access point (M-AP), the relay device R may recognize that the final destination of the data frame is the first terminal STA1, via the address field included in the data frame. Therefore, the relay device R may transmit the data frame to the first terminal STA1 (S1150).

Meanwhile, when the data frame that is transmitted from the relay device R to the first terminal STA1 is acquired, the master access point (M-AP) may determine that the relay device R has successfully received the data frame. That is, the master access point (M-AP) may regard the data frame, which is transmitted from the relay device R to the first terminal STA1, as an ACK frame for the data frame, which the M-AP has transmitted to the relay device R. Alternatively, when the data frame has been successfully received from the master access point (M-AP), the relay device R may transmit an ACK frame, as a response thereto, to the master access point (M-AP). When the data frame has been successfully received from the relay device R, the first terminal STA1 may transmit an ACK frame, as a response thereto, to the relay device R (S1160).

Figure 15:
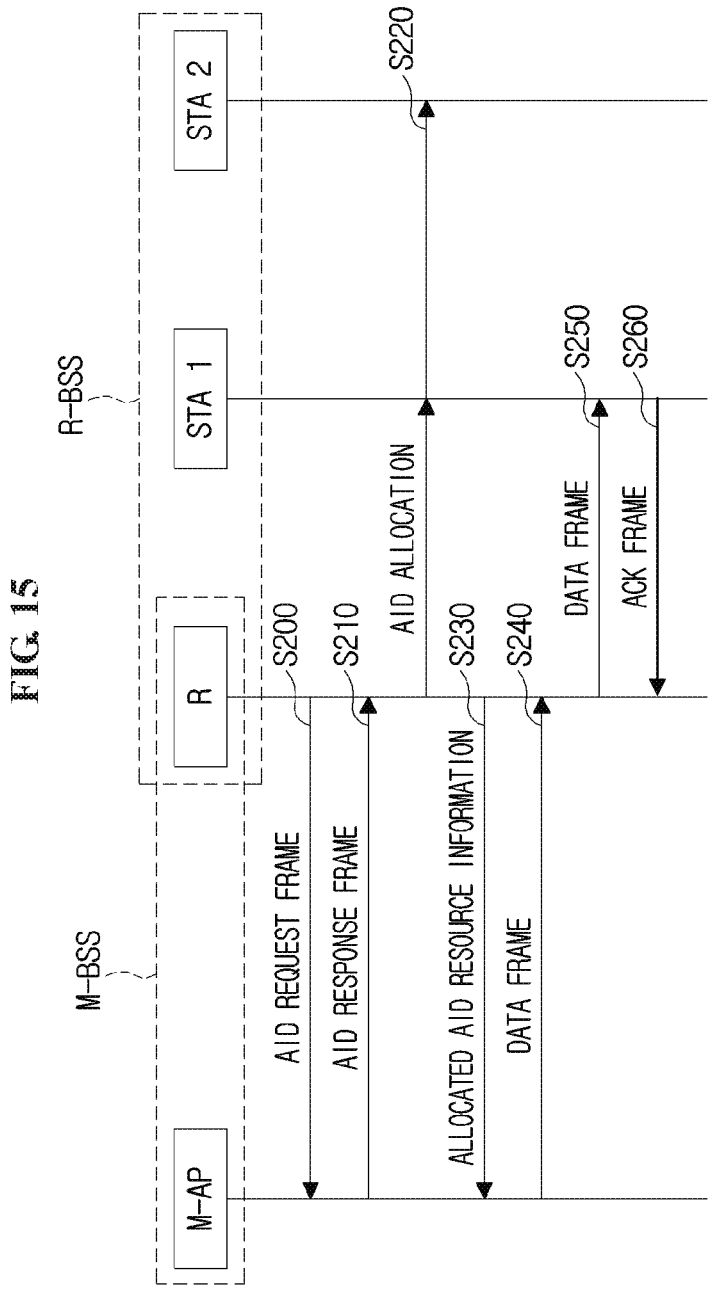
FIG. 15 is a flowchart showing a further embodiment of a data transmission/reception method.

FIG. 15 is a flowchart showing a further embodiment of a data transmission/reception method.

Referring to FIG. 15, a master access point (M-AP) may serve an M-BSS, and a relay device R may belong to the M-BSS. The relay device R may serve an R-BSS, and a first terminal STA1 and a second terminal STA2 may belong to the R-BSS.

After associating with the master access point (M-AP), the relay device R may transmit an AID resource request frame to the master access point (M-AP) so as to request the M-AP to allocate AID resources for terminals belonging to the R-BSS (S1500). The AID resource request frame may include information about an indicator for requesting the allocation of AID resources for terminals belonging to the R-BSS and information about the size (or number) of AID resources, as shown in the following Table 1.

TABLE 1

| Order | Information |
|---|---|
| 1 | Indicator for requesting allocation of AID resources |
| 2 | Size (or number) of AID resources |

When the AID resource request frame is received, the master access point (M-AP) may acquire, from the AID resource request frame, information about the indicator for requesting the allocation of AID resources for terminals belonging to the R-BSS and the size (or number) of the AID resources. That is, by way of the AID resource request frame, the master access point (M-AP) may check the request to allocate AID resources for terminals belonging to the R-BSS and also check the size (or number) of required AID resources. The master access point (M-AP) may generate an AID resource response frame that includes information about AID resources for terminals belonging to the R-BSS, based on the information included in the AID resource request frame, and may transmit the AID resource response frame to the relay device R (S1510).

The AID resource information for the R-BSS may be the range of AIDs to be used for terminals belonging to the R-BSS. Further, the AID resource information may be designated so that the range of AIDs does not overlap the range of AIDs to be used for terminals belonging to the M-BSS. For example, referring to FIG. 12 described above, information about AID resources may be designated on a page ID basis. In this case, the master access point (M-AP) may designate the range of '11 00000 000 001b' to '11 11111 111 111b' as the range of AIDs for terminals belonging to the R-BSS. Alternatively, referring to FIG. 13 described above, information about AID resources may be designated on a block index basis. In this case, the master access point (M-AP) may designate the range of '00 00001 000 001b' to '00 00001 111 111b' as the range of AIDs for terminals belonging to the R-BSS. Alternatively, referring to FIG. 14 described above, the AID resource information may be designated on a sub-block index basis. In this case, the master access point (M-AP) may designate the range of '00 00000 001 001b' to '00 00000 001 111b' as the range of AIDs for terminals belonging to the R-BSS.

The AID resource response frame may include information about an indicator indicating that AID resources for terminals belonging to the R-BSS are allocated, information indicating the start point of AIDs, and information about the size (or number) of AID resources, as shown in the following Table 2. The AID range may be defined by the start point of AIDs and the size (or number) of AID resources.

TABLE 2

| Order | Information |
|---|---|
| 1 | Indicator indicating allocation of AID resources |
| 2 | Start point of AIDs |
| 3 | Size (or number) of AID resources |

When the AID resource response frame is received from the master access point (M-AP), the relay device R may allocate AIDs to the first terminal STA1 and the second terminal STA2 belonging to the R-BSS, based on the AID resource information included in the AID resource response frame (S1520). For example, when the range of AIDs received from the master access point (M-AP) is designated on a page ID basis, the relay device R may allocate different AIDs to the first terminal STA1 and the second terminal STA2 belonging to the R-BSS, within a designated page ID range. When the range of AIDs received from the master access point (M-AP) is designated on a block index basis, the relay device R may allocate different AIDs to the first terminal STA1 and the second terminal STA2 belonging to the R-BSS within a designated block index range. When the range of AIDs received from the master access point (M-AP) is designated on a sub-block index basis, the relay device R may allocate different AIDs to the first terminal STA1 and the second terminal STA2 belonging to the R-BSS within a designated sub-block index range.

The relay device R may transmit the information about AID resources allocated to the terminals belonging to the R-BSS to the master access point (M-AP)(S1530). In this case, the relay device R may transmit the MAC addresses of the terminals belonging to the R-BSS, together with the information about AID resources allocated to the terminals, to the master access point (M-AP). For example, the relay device R may transmit the AID and the MAC address of the first terminal STA1 to the master access point (M-AP), and may transmit the AID and MAC address of the second terminal STA2 to the master access point (M-AP).

When there is a data frame to be transmitted to the first terminal STA1, the master access point (M-AP) may configure the address field included in the corresponding data frame in the way described above according to the 'first embodiment of the address field', 'second embodiment of the address field', 'third embodiment of the address field' or 'fourth embodiment of the address field'. That is, the master access point (M-AP) may configure the DA field of the address field included in the data frame as the AID of the first terminal STA1, or the RA field of the address field included in the data frame as the AID of the relay device R.

The master access point (M-AP) may transmit a data frame including the address field, configured in this way, to the relay device R (S1540). When the data frame is received from the master access point (M-AP), the relay device R may recognize that the final destination of the data frame is the first terminal STA1, via the address field included in the data frame. Therefore, the relay device R may transmit the data frame to the first terminal STA1 (S1550).

Meanwhile, when the data frame that is transmitted from the relay device R to the first terminal STA1 is acquired, the master access point (M-AP) may determine that the relay device R has successfully received the data frame. That is, the master access point (M-AP) may regard the data frame that is transmitted from the relay device R to the first terminal STA1 as an ACK frame for the data frame, which the M-AP has transmitted to the relay device R. Alternatively, when the data frame has been successfully received from the master access point (M-AP), the relay device R may transmit an ACK frame, as a response thereto, to the master access point (M-AP).

When the data frame has been successfully received from the relay device R, the first terminal STA1 may transmit an ACK frame, as a response thereto, to the relay device R (S1560).

Figure 16:
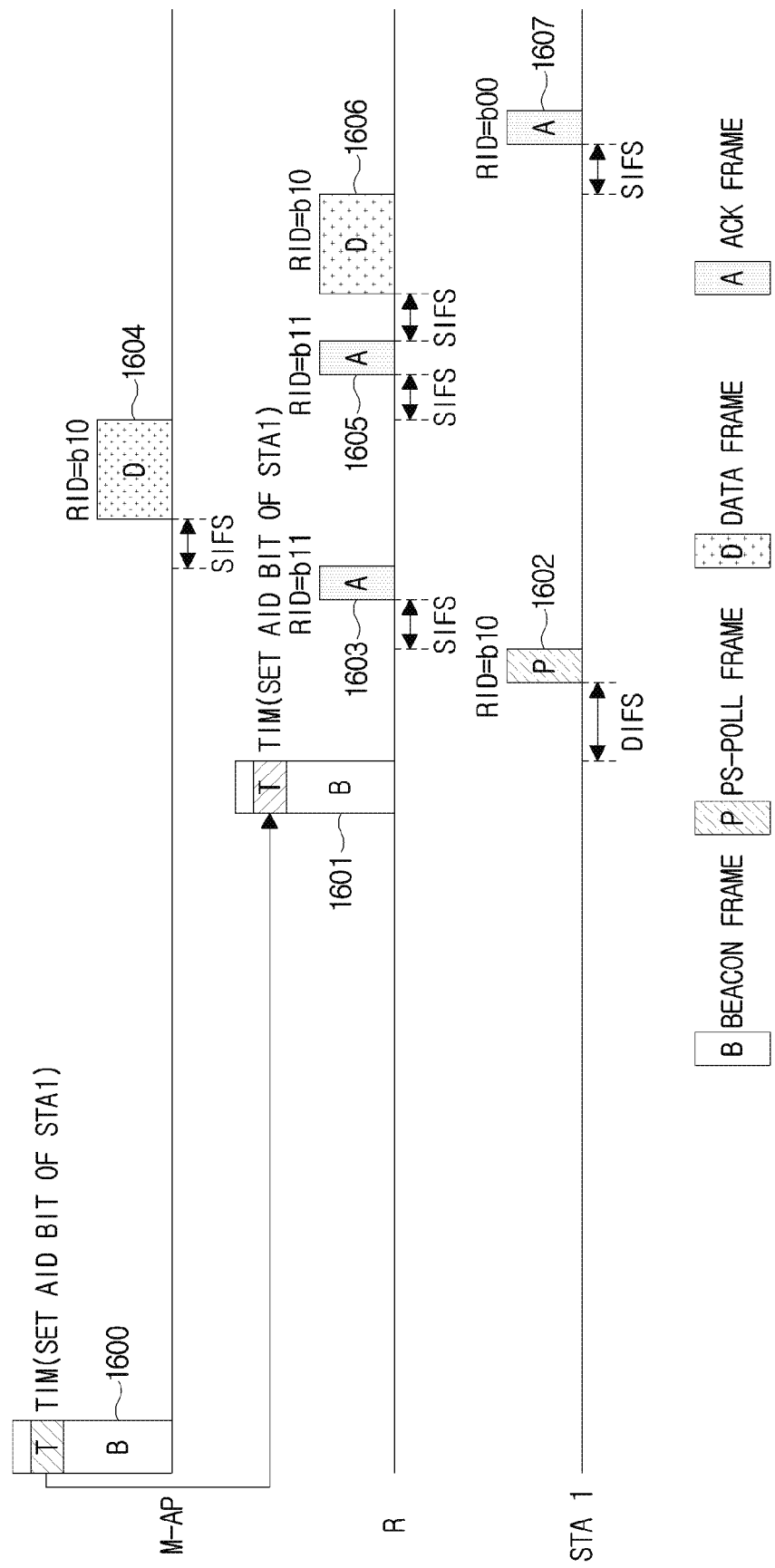
FIG. 16 is a conceptual diagram showing yet another embodiment of a data transmission/reception method.

FIG. 16 is a conceptual diagram showing yet another embodiment of a data transmission/reception method.

Referring to FIG. 16, a master access point (M-AP) may serve an M-BSS, and a relay device R may belong to the M-BSS. The relay device R may serve an R-BSS, and a first terminal STA1 may belong to the R-BSS. Here, the AID of the relay device R may be allocated based on the AID allocation method, described above with reference to FIG. 11. The AID of the first terminal STA1 belonging to the R-BSS may be allocated based on the AID allocation method, as described above with reference to FIG. 11 or the AID allocation method, described above with reference to FIG. 15.

When data to be transmitted to the first terminal STA1 is present, the master access point (M-AP) may set a bit corresponding to the AID of the first terminal STA1 in a TIM to '1' so as to indicate the presence of data, and transmit a beacon frame 1600 including the TIM.

When the beacon frame 1600 is received from the master access point (M-AP), the relay device R may recognize that the bit corresponding to the AID of the first terminal STA1 belonging to the R-BSS is set to '1' in the TIM included in the beacon frame 1600, and may determine, based on the AID, that data to be transmitted to the first terminal STA1 is buffered in the master access point (M-AP). The relay device R may set the bit corresponding to the AID of the first terminal STA1 in the TIM to '1' so as to indicate that data to be transmitted to the first terminal STA1 is present, and may transmit a beacon frame 1601 including the TIM.

When the beacon frame 1601 is received from the relay device R, the first terminal STA1 may recognize that the bit corresponding to its own AID is set to '1' in the TIM included in the beacon frame 1601. That is, the first terminal STA1 may be aware that data to be transmitted thereto is present. The first terminal STA1 may request the transmission of data by transmitting a PS-Poll frame (or a trigger frame) 1602 to the relay device R after a contention window (CW) based on a random backoff procedure has elapsed when a channel is in an idle state during distributed coordination function (DCF) interframe space (DIFS) from the time at which the reception of the beacon frame 1601 is terminated. At this time, the first terminal STA1 may indicate that, after the PS-Poll frame (or the trigger frame) 1602, an ACK frame 1603 that is a normal response is to be transmitted by setting the response indication deferral (RID) bit of a signal (SIG) field included in the PS-Poll frame (or the trigger frame) 1602 to 'b10'.

When the PS-Poll frame (or the trigger frame) 1602 is received from the first terminal STA1, the relay device R may determine that the first terminal STA1 has been awakened (i.e. operated in an awake state), and may then transmit the ACK frame 1603 that is a response to the PS-Poll frame (or the trigger frame) 1602 after a short interframe space (SIFS) has elapsed from the time at which the reception of the PS-Poll frame (or the trigger frame) 1602 is terminated. At this time, the relay device R may indicate that, after the ACK frame 1603, a data frame 1604 that is a long response is to be transmitted by setting the RID bit of a SIG field included in the ACK frame 1603 to 'b11'.

Meanwhile, the master access point (M-AP) cannot receive the PS-Poll frame (or the trigger frame) 1602 that is transmitted from the first terminal STA1, but it can receive the ACK frame 1603 that is transmitted from the relay device R as a response to the PS-Poll frame (or the trigger frame) 1602. Therefore, when the ACK frame 1603 transmitted from the relay device R is received, the master access point (M-AP) may determine that the first terminal STA1 has been awakened, and may then transmit a data frame 1604 to the relay device R after SIFS has elapsed from the reception termination time of the ACK frame 1603. At this time, the master access point (M-AP) may indicate that, after the data frame, an ACK frame 1605 that is a normal response is to be transmitted by setting the RID bit of a SIG field included in the data frame 1604 to 'b10'.

When the data frame 1604 has been successfully received, the relay device R may transmit the ACK frame 1605 that is a response to the data frame 1604 to the master access point (M-AP) after SIFS has elapsed from the reception termination time of the data frame 1604. At this time, the relay device R may indicate that, after the ACK frame 1605, a data frame 1606 that is a long response is to be transmitted by setting the RID bit of a SIG field included in the ACK frame 1605 to 'b11'. Here, the data frame 1606 may include the same information as the data frame 1604 transmitted from the master access point (M-AP).

Thereafter, the relay device R may transmit the data frame 1606 to the first terminal STA1 after SIFS has elapsed from the transmission termination time of the ACK frame 1605. Here, the relay device R may indicate that, after the data frame 1606, an ACK frame 1607 that is a normal response is to be transmitted by setting the RID bit of a SIG field included in the data frame 1606 to 'b10'. When the data frame 1606 has been successfully received, the first terminal STA1 may transmit the ACK frame 1607 that is a response to the data frame 1606 to the relay device R after SIFS has elapsed from the reception termination time of the data frame 1606. Here, the first terminal STA1 may indicate that, after the ACK frame 1607, no data frames are to be transmitted by setting the RID bit of a SIG field included in the ACK frame 1607 to 'b00'.

Meanwhile, when desiring to transmit a data frame to terminals belonging to the R-BSS in a broadcast (or multicast) manner, the master access point (M-AP) may set a separate broadcast/multicast AID bit allocated to the relay device R, which serves the R-BSS, in a TIM. At this time, the AID allocated to the relay device R may replace the broadcast/multicast AID. The master access point (M-AP) may generate a beacon frame including the TIM in which the AID bit of the relay device R is set, and transmit the generated beacon frame. That is, the AID of the relay device R may be used as an indicator for broadcast (or multicast) transmission to the terminals belonging to the R-BSS.

When the beacon frame is received from the master access point (M-AP), the relay device R may recognize that its own AID bit is set in the TIM included in the beacon frame, and may determine, based on the AID bit, that data to be transmitted in a broadcast (or multicast) manner to the terminals belonging to the R-BSS is buffered in the master access point (M-AP). Therefore, the relay device R may set the AID bits of all terminals belonging to the R-BSS in the TIM, generate a beacon frame including the TIM in which the AID bits of all terminals belonging to the R-BSS are set, and transmit the generated beacon frame.

When the beacon frame is received from the relay device R, the terminals belonging to the R-BSS may recognize that their own AID bits are set in the TIM included in the beacon frame, and may determine, based on the AID bits, that data to be transmitted thereto is present. The terminals belonging to the R-BSS may request the relay device R to transmit data frames by transmitting PS-Poll frames (or trigger frames) to the relay device R.

When the PS-Poll frames (or the trigger frames) are received from the terminals belonging to the R-BSS, the relay device R may determine that the terminals belonging to the R-BSS have been awakened and may then transmit an ACK frame as a response to the PS-Poll frames (or the trigger frames).

Meanwhile, the master access point (M-AP) cannot receive the PS-Poll frames (or the trigger frames) transmitted from the terminals belonging to the R-BSS, but may receive the ACK frame transmitted from the relay device R as the response to the PS-Poll frames (or trigger frames). Therefore, when the ACK frame transmitted from the relay device R is received, the master access point (M-AP) may determine that the terminals belonging to the R-BSS have been awakened, and may then transmit a data frame to the relay device R.

When the data frame has been successfully received, the relay device R may transmit an ACK frame, as a response to the data frame, to the master access point (M-AP). Thereafter, the relay device R may transmit the data frame to the terminals belonging to the R-BSS in a broadcast (or multicast) manner.

Figure 17:
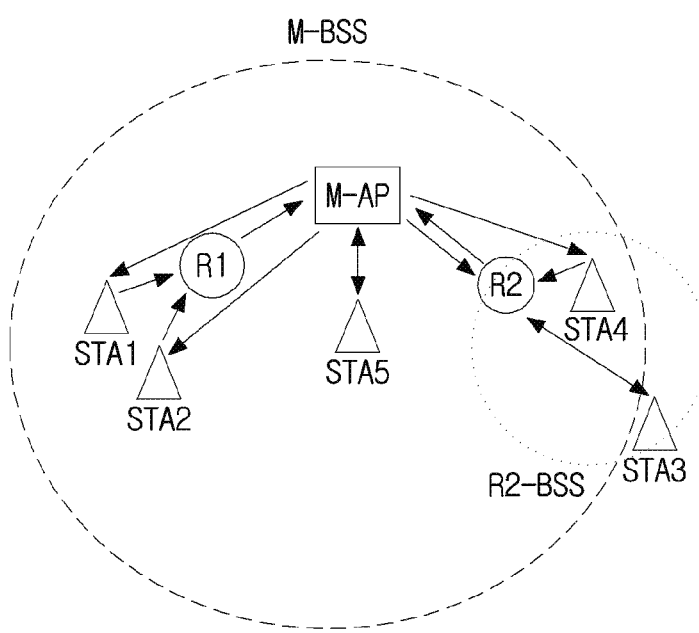
FIG. 17 is a conceptual diagram showing another embodiment of a WLAN system including relay devices.

FIG. 17 is a conceptual diagram showing another embodiment of a WLAN system including relay devices.

Referring to FIG. 17, a master access point (M-AP), a first relay device R1, a second relay device R2, a first terminal STA1, a second terminal STA2, a fourth terminal STA4, and a fifth terminal STA5 may constitute an M-BSS. The second relay device R2, a third terminal STA3, and the fourth terminal STA4 may constitute a second relay BSS (R2-BSS).

The first relay device R1 may not constitute its own independent relay BSS. In this case, the first relay device R1 may function to acquire only uplink frames, which are transmitted from the terminals STA1 and STA2 to the master access point (M-AP), from the terminals STA1 and STA2, and to forward the uplink frames to the master access point (M-AP). That is, the function of a relay access point (R-AP, see FIG. 10) that acts as an access point in the first relay device R1 may not be present or may not be used, and only the function of a relay terminal (R-STA, see FIG. 10) may be used to forward the uplink frames acquired from the terminals STA1 and STA2 to the master access point (M-AP).

Since the first relay device R1 does not form its own independent relay BSS, it may not independently transmit a beacon frame or a probe response frame. Therefore, when each of the terminals STA1 and STA2 performs a probe procedure, it can identify the existence of the master access point (M-AP), but cannot identify the existence of the first relay device R1. Further, the first relay device R1 may not perform an authentication procedure, an association procedure, etc. with each of the terminals STA1 and STA2. That is, each of the terminals STA1 and STA2 may perform an authentication procedure, an association procedure, etc. with the master access point (M-AP).

Figure 18:
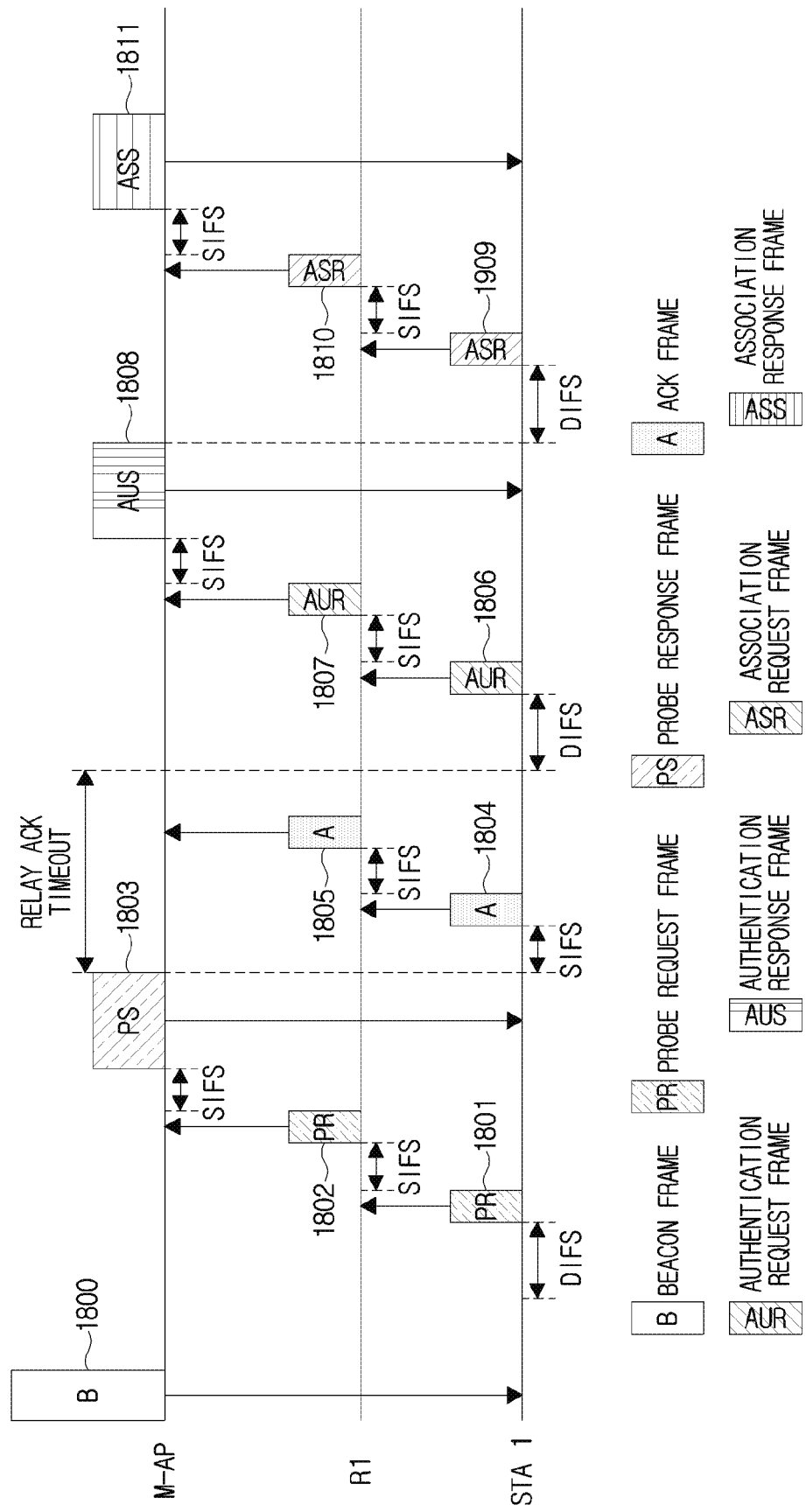
FIG. 18 is a conceptual diagram showing an association method in an uplink relay mode according to an embodiment of the present invention.

FIG. 18 is a conceptual diagram showing an association method in an uplink relay mode according to an embodiment of the present invention.

Referring to FIG. 18, a master access point (M-AP) may denote the master access point (M-AP) shown in FIG. 17, a first relay device R1 may denote the first relay device R1 shown in FIG. 17, and a first terminal STA1 may denote the first terminal STA1 shown in FIG. 17. That is, the master access point (M-AP) may constitute an M-BSS. The first relay device R1 may be associated with the master access point (M-AP) and may not constitute its own independent relay BSS. The first terminal STA1 may belong to the M-BSS served by the master access point (M-AP).

The master access point (M-AP) may transmit a beacon frame 1800 in a broadcast manner. In order to probe a neighboring access point, the first terminal STA1 may transmit a probe request frame 1801. Here, the first terminal STA1 may transmit the probe request frame 1801 after a contention window (CW) based on a random backoff procedure when a channel is in an idle state during DIFS. The probe request frame 1801 may include a field indicating whether a relevant frame is a frame transmitted in a relay manner. For example, the first terminal STA1 may indicate that the probe request frame 1801 cannot be transmitted through a certain relay device by setting the field, indicating whether the relevant frame is a frame transmitted in a relay manner, to '0'. Further, the first terminal STA1 may indicate that the probe request frame 1801 can be transmitted through a certain relay device by setting the field, indicating whether the relevant frame is a frame transmitted in a relay manner, to '1'.

The first relay device R1 may acquire the probe request frame 1801 that is transmitted from the first terminal STA1. When the SSID field of the probe request frame 1801 is set to the SSID of the master access point (M-AP) or any value, the first relay device R1 may transmit a probe request frame 1802 including the same information as the probe request frame 1801 to the master access point (M-AP) after SIFS has elapsed from the reception termination time of the probe request frame 1801.

Alternatively, when the field, included in the probe request frame 1801 and indicating whether the relevant frame is a frame transmitted in a relay manner, indicates that the probe request frame 1801 can be transmitted through a certain relay device, the first relay device R1 may transmit the probe request frame 1802 having the same information as the probe request frame 1801 to the master access point (M-AP) after SIFS has elapsed from the reception termination time of the probe request frame 1801. In contrast, when the field, included in the probe request frame 1801 and indicating whether the relevant frame is a frame transmitted in a relay manner, indicates that the probe request frame 1801 cannot be transmitted through a certain relay device, the first relay device R1 may not transmit the probe request frame 1801 to the master access point (M-AP).

Meanwhile, the first relay device R1 may set the address field of the probe request frame 1802 in the following manner.

TA field: address (i.e. MAC address) of first relay device
RA field: broadcast address
DA field: broadcast address
SA field: address (i.e. MAC address) of first terminal The master access point (M-AP) cannot receive the probe request frame 1801 that is transmitted from the first terminal STA1, but it can receive the probe request frame 1802 transmitted from the first relay device R1. The master access point (M-AP) may determine whether the frame from the first relay device R1 is being transmitted in a relay manner, based on at least one of the field, included in the probe request frame 1802 and indicating whether the relevant frame is a frame transmitted in a relay manner, and the address fields of the probe request frame 1802.

For example, when the field, included in the probe request frame 1802 and indicating whether the relevant frame is a frame transmitted in a relay manner, indicates that the frame can be transmitted through a certain relay device, the master access point (M-AP) may determine that the probe request frame 1802 is being transmitted in a relay manner. Alternatively, when the TA field of the address fields included in the probe request frame 1802 indicates the address of the first relay device R1 and the SA field of the address fields indicates the address of the first terminal STA1, the master access point (M-AP) may determine that the probe request frame 1802 is being transmitted through the first relay device R1.

The master access point (M-AP) may generate a probe response frame 1803 that is a response to the probe request frames 1801 and 1802. The probe response frame 1803 may include an unlink relay mode field indicating whether the M-AP is operated in an uplink relay mode. For example, the case where the uplink relay mode field is set to '0' may mean that the M-AP is not operated in an uplink relay mode. The case where the uplink relay mode field is set to '1' may mean that the M-AP is operated in an uplink relay mode. Here, the master access point (M-AP) may indicate that it is operated in an uplink rely mode by setting the uplink relay mode field of the probe response frame 1803 to '1'.

Also, the probe response frame 1803 may include the identifier (i.e. MAC address, AID, Partial AID (PAID), or the like) of a relay device for performing uplink relay transmission. Here, the master access point (M-AP) may generate a probe response frame 1803 including the identifier of the first relay device R1.

The master access point (M-AP) may transmit the probe response frame 1803, including the uplink relay mode field, the identifier of the first relay device R1, etc., to the first terminal STA1. Here, the master access point (M-AP) may transmit the probe response frame 1803 to the first terminal STA1 after SIFS has elapsed from the reception termination time of the probe request frame 1802.

Meanwhile, the first terminal STA1 may receive the probe response frame 1803 transmitted from the master access point (M-AP). The first terminal STA1 may acquire the uplink relay mode field included in the probe response frame 1803 and the identifier of the relay device for performing uplink relay transmission, and may recognize, based on the acquired information, that the master access point (M-AP) and the first relay device R1 are operated in an uplink relay mode.

The first terminal STA1 may transmit the ACK frame 1804 that is a response to the probe response frame 1803 to the first relay device R1 after SIFS has elapsed from the reception termination time of the probe response frame 1803. The first relay device R1, having received the ACK frame 1804, may transmit an ACK frame 1805 including the same information as the ACK frame 1804 to the master access point (M-AP) after SIFS has elapsed from the reception termination time of the ACK frame 1804.

Meanwhile, since a response to the probe response frame 1803 is transmitted to the master access point (M-AP) through the first relay device R1, the master access point (M-AP) may define a separate relay ACK timeout for the first terminal STA1 that is operated in an uplink relay mode. For example, the relay ACK timeout may be designated to be longer than an existing ACK timeout (i.e. SIFS+reception_start_delay (RX_Start_Delay)+slot time), as given in the following Equation 1. The existing ACK timeout may mean the maximum time during which a first communication entity is waiting for an ACK frame, which is a response to a certain frame, to be received from a second communication entity after having transmitted the certain frame to the second communication entity.

$$\text{relay ACK timeout} \geq 2 \times \text{ACK timeout} \qquad \text{Equation 1}$$

Therefore, when a probe ACK frame 1805 that is a response to the probe response frame 1803 is not received from the first relay device R1 within the relay ACK timeout from the transmission termination time of the probe response frame 1803, the master access point (M-AP) may determine that the first terminal STA1 has not successfully received the probe response frame 1803. In this case, the master access point (M-AP) may retransmit the probe response frame 1803 to the first terminal STA1.

If the above probe procedure has been completed in this way, the first terminal STA1 may perform a procedure for authentication with the master access point (M-AP). After a time corresponding to 'relay ACK timeout+DIFS' has elapsed, the first terminal STA1 may transmit an authentication request frame 1806 to the first relay device R1. The first relay device R1, having received the authentication request frame 1806, may transmit an authentication request frame 1807, including the same information as the authentication request frame 1806, to the master access point (M-AP) after SIFS has elapsed from the reception termination time of the authentication request frame 1806. Here, each of the authentication request frames 1806 and 1807 may include an uplink relay mode field indicating whether the relevant device is operated in an uplink relay mode.

The master access point (M-AP), having received the authentication request frame 1807, may transmit an authentication response frame 1808 that is a response to the authentication request frame 1807 to the first terminal STA1 after SIFS has elapsed from the reception termination time of the authentication request frame 1807. Here, the authentication response frame 1808 may include an uplink relay mode field indicating whether a relevant device is operated in an uplink relay mode.

After the authentication procedure has been completed in this way, the first terminal STA1 may perform a procedure for associating with the master access point (M-AP). The first terminal STA1 may transmit an association request frame 1809 to the first relay device R1 after DIFS has elapsed from the reception termination time of the authentication response frame 1808. The first relay device R1, having received the association request frame 1809, may transmit an association request frame 1810, including the same information as the association request frame 1809, to the master access point (M-AP) after SIFS has elapsed from the reception termination time of the association request frame 1809. Here, each of the association request frames 1809 and 1810 may include an uplink relay mode field indicating whether a relevant device is operated in an uplink relay mode.

The master access point (M-AP), having received the association request frame 1810, may transmit an association response frame 1811 to the first terminal STA1 after SIFS has elapsed from the reception termination time of the association request frame 1810. Here, the association response frame 1811 may include a field indicating that the first terminal STA1 has been associated with the master access point (M-AP) in an uplink relay mode, the AID of the first terminal STA1, etc.

The first terminal STA1 may be associated with the master access point (M-AP) via the above-described association procedure. Below, a method for transmitting and receiving data between the master access point (M-AP) and the first terminal STA1, which are associated with each other based on the uplink relay mode, will be described.

Figure 19:
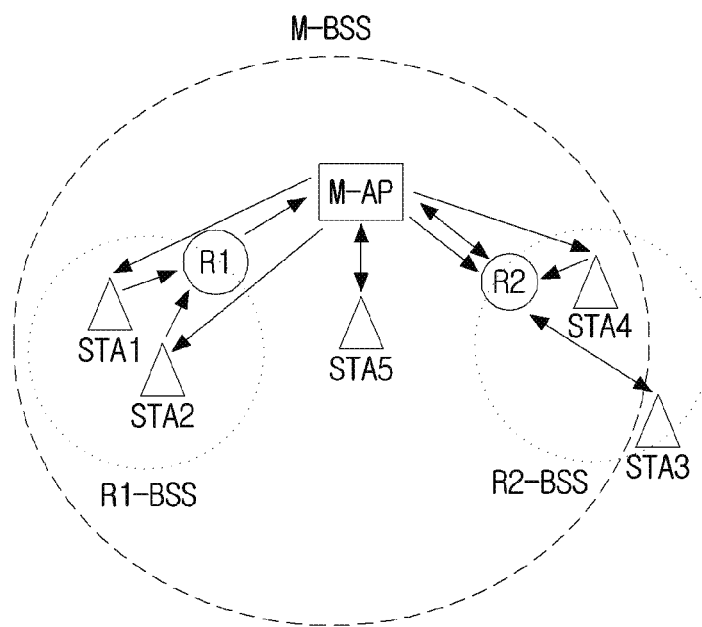
FIG. 19 is a conceptual diagram showing a further embodiment of a WLAN system including relay devices.

FIG. 19 is a conceptual diagram showing a further embodiment of a WLAN system including relay devices.

Referring to FIG. 19, a master access point (M-AP), a first relay device R1, a second relay device R2, a first terminal STA1, a second terminal STA2, a fourth terminal STA4, and a fifth terminal STA5 may constitute an M-BSS. The first relay device R1, the first terminal STA1, and the second terminal STA2 may constitute a first relay BSS (R1-BSS). The second relay device R2, a third terminal STA3, and the fourth terminal STA4 may constitute a second relay BSS (R2-BSS).

When the transmission power of the master access point (M-AP) is sufficiently high, each frame may be transmitted in an uplink relay mode. In the uplink relay mode, downlink transmission may be performed such that the master access point (M-AP) directly transmits a frame to the terminals STA1, STA2, and STA4, and uplink transmission may be performed such that each of the terminals STA1, STA2, and STA4 transmits a frame to the master access point (M-AP) through the relay device R1 or R2.

All terminals associated with each of the relay devices R1 and R2 may be operated in an uplink relay mode. Alternatively, some terminals associated with each of the relay devices R1 and R2 may be operated in an uplink relay mode, and the remaining terminals may be operated in a normal relay mode (i.e. both uplink transmission and downlink transmission are performed through relays). Since the first terminal STA1 and the second terminal STA2 associated with the first relay device R1 belong to the M-BSS, they may be operated in an uplink relay mode. Since the third terminal STA3 associated with the second relay device R2 does not belong to the M-BSS, it may be operated in a normal relay mode other than an uplink relay mode. Since the fourth terminal STA4 associated with the second relay device R2 belongs to the M-BSS, it may be operated in an uplink relay mode.

Meanwhile, such an uplink relay mode may be initiated at the request of a specific terminal. For example, the first terminal STA1 may request the first relay device R1 to be operated in an uplink relay mode when recognizing that the STA1 is located in the M-BSS. In this case, the first relay device R1 may notify the first terminal STA1 of the target beacon transmission time (TBTT) of the master access point (M-AP), and may notify the master access point (M-AP) that the first terminal STA1 is operated in an uplink relay mode.

When recognizing that the first terminal STA1 is operated in an uplink relay mode, the master access point (M-AP) may set a bit corresponding to the AID of the first terminal STA1 in a TIM included in a beacon frame to '1' so as to transmit data to the first terminal STA1. The first terminal STA1 may receive a beacon frame transmitted from the master access point (M-AP) based on the TBTT of the master access point (M-AP). The first terminal STA1 may determine that data to be transmitted thereto is present in the master access point (M-AP) when the bit corresponding to the AID of the STA1 is set to '1' in the TIM included in the received beacon frame.

Figure 20:
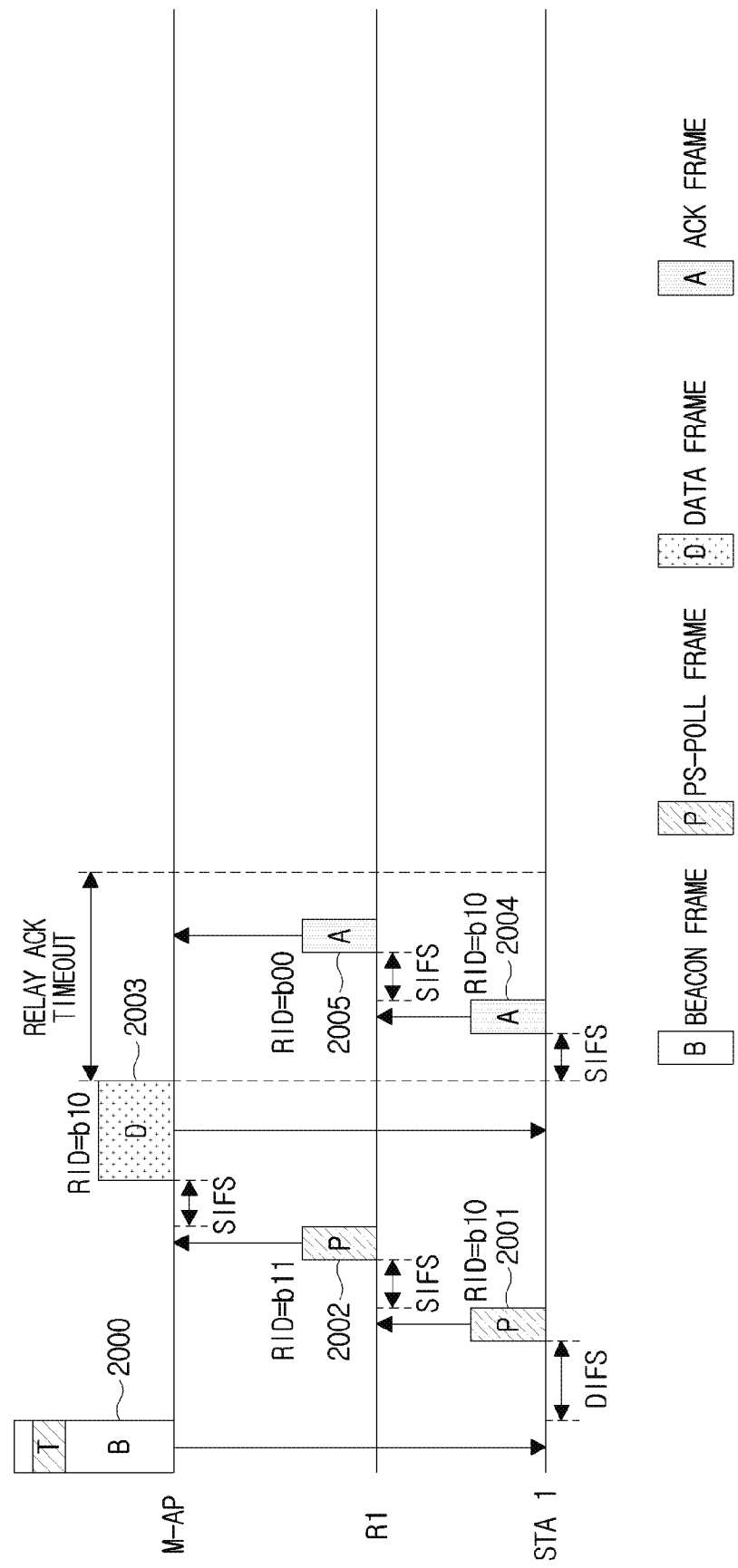
FIG. 20 is a conceptual diagram showing still another embodiment of a data transmission/reception method.

FIG. 20 is a conceptual diagram showing still another embodiment of a data transmission/reception method according to the present invention.

Referring to FIG. 20, a master access point (M-AP) may denote the master access point (M-AP) shown in FIG. 19, a first relay device R1 may denote the first relay device R1 shown in FIG. 19, and a first terminal STA1 may denote the first terminal STA1 shown in FIG. 19. That is, the first relay device R1 may be associated with the master access point (M-AP), and the first terminal STA1 may be associated with the first relay device R1. The first terminal STA1 may belong to an M-BSS served by the master access point (M-AP) and an R1-BSS served by the first relay device R.

The transmission and reception of frames between the master access point (M-AP), the first relay device R1, and the first terminal STA1 may be performed based on an uplink relay mode. In this case, if data to be transmitted to the first terminal STA1 is buffered, the master access point (M-AP) may set a bit corresponding to the AID of the first terminal STA1 in a TIM to '1', and may transmit a beacon frame 2000 including the TIM.

Since the first terminal STA1 is located in the M-BSS, it may receive the beacon frame 2000 transmitted from the master access point (M-AP). The first terminal STA1 may determine that data to be transmitted thereto is buffered in the master access point (M-AP) because the bit corresponding to the AID of the STA1 in the TIM included in the received beacon frame 2000 is set to '1'.

Therefore, when a channel is in an idle state during DIFS from the reception termination time of the beacon frame 2000, the first terminal STA1 may transmit a PS-Poll frame (or a trigger frame) 2001 to the first relay device R1 after a contention window (CW) based on a random backoff procedure. At this time, the first terminal STA1 may indicate that, after the PS-Poll frame (or the trigger frame) 2001, a PS-Poll frame (or a trigger frame) 2002 that is a normal type response frame is to be transmitted by setting the RID bit of a SIG field included in the PS-Poll frame (or the trigger frame) 2001 to 'b10'. Meanwhile, when the PS-Poll frame (or the trigger frame) 2001 is a null data packet (NDP)-type frame, the first terminal STA1 may indicate that, after the PS-Poll frame (or the trigger frame) 2001, a PS-Poll frame (or a trigger frame) 2002 that is an NDP-type response frame is to be transmitted by setting the RID bit of the SIG field to 'b01'. That is, a certain frame transmitted from the first terminal STA1 may include an RID bit that is information indicating the type of the frame transmitted from a communication entity (e.g. the relay device R or the master access point (M-AP)) that has received the certain frame.

When the PS-Poll frame (or the trigger frame) 2001 is received from the first terminal STA1, the first relay device R1 may transmit the PS-Poll frame (or the trigger frame) 2002 to the master access point (M-AP) after SIFS has elapsed from the reception termination time of the PS-Poll frame (or trigger frame) 2001. The PS-Poll frame (or the trigger frame) 2002 may include the same information as the PS-Poll frame (or trigger frame) 2001 received from the first terminal STA1. At this time, the first relay device R1 may indicate that, after the PS-Poll frame (or the trigger frame) 2002, a data frame 2003 that is a long response frame is to be transmitted by setting the RID bit of a SIG field included in the PS-Poll frame (or the trigger frame) 2002 to 'b11'.

The master access point (M-AP) may determine that, when the PS-Poll frame (or the trigger frame) 2002 is received from the first relay device R1, the first terminal STA1 is in the state in which a frame can be received (i.e. an awake state). Therefore, the master access point (M-AP) may transmit the data frame 2003 to the first terminal STA1 after SIFS has elapsed from the reception termination time of the PS-Poll frame (or the trigger frame) 2002. At this time, the master access point (M-AP) may indicate that, after the data frame 2003, an ACK frame 2004 that is a normal type response frame is to be transmitted by setting the RID bit of a SIG field included in the data frame 2003 to 'b10'.

Meanwhile, since a response to the data frame 2003 is transmitted through the first relay device R1, the master access point (M-AP) may set a duration field included in the data frame 2003 to a period corresponding to 'SIFS+length of ACK frame 2004+SIFS+length of ACK frame 2005' to protect the transmission of the ACK frames 2004 and 2005.

When the data frame 2003 is received, the first terminal STA1 may transmit the ACK frame 2004 that is a response to the data frame 2003 to the first relay device R1 after SIFS has elapsed from the reception termination time of the data frame 2003. At this time, the first terminal STA1 may indicate that, after the ACK frame 2004, an ACK frame 2005 that is a normal type response frame is to be transmitted by setting the RID bit of a SIG field included in the ACK frame 2004 to 'b10'.

When the ACK frame 2004 is received, the first relay device R1 may transmit the ACK frame 2005 to the master access point (M-AP) after SIFS has elapsed from the reception termination time of the ACK frame 2004. The ACK frame 2005 may include the same information as the ACK frame 2004 that is a response to the data frame 2003. At this time, the first relay device R1 may indicate that, after the ACK frame 2005, no frames are to be transmitted by setting the RID bit of a SIG field included in the ACK frame 2005 to 'b00'. When the ACK frame 2005 is received, the master access point (M-AP) may determine that the first terminal STA1 has successfully received the data frame 2003.

Meanwhile, since a response to the data frame 2003 is transmitted to the master access point (M-AP) through the first relay device R1, the master access point (M-AP) may define a separate relay ACK timeout for the first terminal STA1 that is operated in an uplink relay mode. For example, the relay ACK timeout may be designated to be longer than an existing ACK timeout (i.e. SIFS+Reception_start_delay (RX_Start_Delay)+slot time), as given in the above Equation 1. The existing ACK timeout may mean the maximum time during which a first communication entity is waiting for an ACK frame, which is a response to a certain frame, to be received from a second communication entity after having transmitted the certain frame to the second communication entity.

Therefore, when an ACK frame 2005 that is a response to the data frame 2003 is not received from the first relay device R1 within the relay ACK timeout from the transmission termination time of the data frame 2003, the master access point (M-AP) may determine that the first terminal STA1 has not successfully received the data frame 2003. In this case, the master access point (M-AP) may retransmit the data frame 2003 to the first terminal STA1.

In accordance with the present invention, a master access point may extend a service area via a relay device. Since a terminal may secure a good quality link via the relay device, data can be transmitted at high speed. That is, the relay device is used, and thus the efficiency of use of a wireless channel may be improved and the amount of power consumed by the terminal may be reduced.

Further, the master access point may allocate available AID resources to a relay device, and the relay device may allocate AIDs among AID resources allocated by the master access point to end terminals. By means of this, the master access point may directly manage the AIDs of end terminals belonging to an R-BSS. Accordingly, the master access point may easily set the AID of the end terminal in a TIM when a data frame is transmitted to an end terminal through the relay device. The relay device may easily map the reception address of a data frame during a procedure for forwarding a data frame received from the master access point to the end terminal.

Furthermore, the AID of the relay device may be used as an indicator for broadcast (or multicast) transmission to end terminals belonging to the corresponding R-BSS. Therefore, the master access point may broadcast (or multicast) a data frame to the terminals belonging to the R-BSS using the AID of the relay device.

Furthermore, when the master access point transmits a data frame to an end terminal through the relay device, the AID of the relay device, instead of the MAC address of the relay device, may be used as the reception address (i.e. RA field) of the data frame, and thus the length of the data frame may be reduced.

Furthermore, when a data frame is transmitted to the end terminal via the relay device, the master access point may use the AID of the end terminal, instead of the MAC address of the end terminal, as the destination address (i.e. DA field) of the data frame, and thus the length of the data frame may be reduced.

Furthermore, in accordance with an uplink relay mode, downlink transmission may be performed such that the master access point directly transmits a frame to an end terminal, and uplink transmission may be performed such that an end terminal transmits a frame to the master access point through the relay device. Therefore, when the uplink relay mode is used, wireless channel resources may be efficiently used compared to a normal relay mode in which frames are bidirectionally transmitted through a relay device.

The embodiments of the present invention may be implemented in the form of program instructions that are executable via various types of computer means, and may be recorded on a computer-readable medium. The computer-readable medium may include program instructions, data files, and data structures solely or in combination. Program instructions recorded on the computer-readable medium may have been specially designed and configured for the embodiments of the present invention, or may be known to or available to those who have ordinary knowledge in the field of computer software.

Examples of the computer-readable storage medium include all types of hardware devices specially configured to store and execute program instructions, such as read only memory (ROM), random access memory (RAM), and flash memory. The hardware devices may be configured to operate as one or more software modules in order to perform the operation according to embodiments of the present invention, and vice versa. Examples of the program instructions include machine language code, such as code created by a compiler, and high-level language code executable by a computer using an interpreter or the like.

Although the present invention has been described with reference to the embodiments, those skilled in the art will appreciate that the present invention can be modified and changed in various forms, without departing from the spirit and scope of the invention as disclosed in the accompanying claims.

The invention claimed is:

1. A method comprising:
receiving a beacon frame or probe response frame by a terminal from a relay device;
identifying, by the terminal, based on the received beacon frame or probe response frame, whether data to be transmitted to the terminal is present in a master access point associated with the relay device;
based on identifying that data to be transmitted to the terminal is present in the master access point associated with the relay device, setting, by the terminal, information in a power save (PS)-Poll frame to indicate to a relay device that, after the PS-Poll frame, an ACK frame that is a normal response is to be transmitted by the relay device to the master access point;
transmitting, by the terminal, the PS-Poll frame to the relay device;
receiving, by the terminal from the relay device, a data frame that is a response to the transmitted PS-Poll frame and that is sourced from the master access point; and
transmitting, by the terminal, an ACK frame that is a response to the data frame sourced from the master access point to the relay device.

2. The method of claim 1, wherein the terminal belongs to a master-basic service set formed by the master access point and a relay-basic service set formed by the relay device.

3. The method of claim 1, wherein a certain frame transmitted from the terminal comprises information indicating a type of a frame transmitted from a communication entity that has received the certain frame.

4. The method of claim 1, wherein the PS-Poll frame is transmitted to the master access point through the relay device.

5. The method of claim 1, wherein the PS-Poll frame comprises the signal (SIG) field, which includes information indicating that, after the PS-poll frame, a normal type response frame is to be transmitted.

6. The method of claim 1, wherein the data frame comprises a SIG field that includes information indicating that, after the data frame, a normal type response frame is to be transmitted.

7. The method of claim 1, wherein the data frame comprises a duration field in which a period required to protect transmission of at least two ACK frames is set.

8. The method of claim 1, wherein the ACK frame is transmitted to the master access point through the relay device.

9. The method of claim 1, wherein the ACK frame comprises a SIG field that includes information indicating that, after the ACK frame, a normal type response frame is to be transmitted.

* * * * *